(12) United States Patent
Elia et al.

(10) Patent No.: US 10,094,694 B2
(45) Date of Patent: Oct. 9, 2018

(54) DROP AND DRIP MEASUREMENT

(71) Applicant: ART Healthcare Ltd., Ashkelon (IL)

(72) Inventors: Liron Elia, Kiryat-Ata (IL); Gavriel J. Iddan, Haifa (IL)

(73) Assignee: ART Healthcare Ltd., Natania (IL)

( * ) Notice: Subject to any disclaimer, the term of this patent is extended or adjusted under 35 U.S.C. 154(b) by 0 days.

(21) Appl. No.: 14/951,256

(22) Filed: Nov. 24, 2015

(65) Prior Publication Data

US 2016/0146654 A1    May 26, 2016

Related U.S. Application Data

(60) Provisional application No. 62/083,575, filed on Nov. 24, 2014.

(51) Int. Cl.
*G01F 22/00* (2006.01)
*G01B 11/04* (2006.01)
(Continued)

(52) U.S. Cl.
CPC .......... *G01F 22/00* (2013.01); *G01B 11/046* (2013.01); *G01F 13/006* (2013.01); *G01F 13/008* (2013.01); *G01P 3/64* (2013.01)

(58) Field of Classification Search
CPC .......... G01F 22/00; G01B 11/046; G01P 3/00
See application file for complete search history.

(56) References Cited

U.S. PATENT DOCUMENTS 3,664,339 A * 5/1972 Santomieri .......... A61M 5/1411
                                                        137/399
3,776,229 A * 12/1973 McPhee ............... A61M 5/1411
                                                        215/313
(Continued)

FOREIGN PATENT DOCUMENTS

EP          0112699       7/1984
JP          04-051963     2/1992
(Continued)

OTHER PUBLICATIONS

International Search Report and the Written Opinion dated Mar. 1, 2016 From the International Searching Authority Re. Application No. PCT/IL2015/051143.
(Continued)

*Primary Examiner* — Stephanie Bloss
*Assistant Examiner* — Lisa Peters

(57) ABSTRACT

According to some embodiments of the present invention there are provided a method for calculating a volume of an individual falling drop of liquid by analyzing electromagnetic radiation (EMR) reception, the method comprising projecting electromagnetic radiation (EMR) from an EMR source, measuring the EMR using at least one EMR sensor when the EMR is partially interfered with by a drop falling between the EMR source and the EMR sensor, calculating a plurality of widths parallel to a vertical axis of the drop, each one of the plurality of widths is calculated according to a reception of a time correlated measured portion of the EMR, and calculating a volume of the drop by combining the plurality of widths and a velocity of the drop when the drop is falling between the EMR source and the EMR sensor.

11 Claims, 18 Drawing Sheets

(51) Int. Cl.
*G01P 3/64* (2006.01)
*G01F 13/00* (2006.01)

(56) References Cited

U.S. PATENT DOCUMENTS

| | | | | |
|---|---|---|---|---|
| 4,038,982 A * | 8/1977 | Burke | | A61M 5/1689 |
| | | | | 128/DIG. 13 |
| 4,261,388 A * | 4/1981 | Shelton | | A61M 5/1689 |
| | | | | 137/486 |
| 4,490,140 A * | 12/1984 | Carr | | A61M 5/1689 |
| | | | | 128/DIG. 13 |
| 4,504,263 A * | 3/1985 | Steuer | | A61B 5/208 |
| | | | | 128/DIG. 13 |
| 4,525,163 A * | 6/1985 | Slavik | | A61M 5/1689 |
| | | | | 128/DIG. 12 |
| 4,533,350 A * | 8/1985 | Danby | | A61M 5/1689 |
| | | | | 604/253 |
| 4,820,281 A * | 4/1989 | Lawler, Jr. | | G01F 3/00 |
| | | | | 604/253 |
| 4,936,828 A * | 6/1990 | Chiang | | A61M 5/1689 |
| | | | | 604/253 |
| 5,186,057 A * | 2/1993 | Everhart | | G01B 11/00 |
| | | | | 250/575 |
| 5,377,101 A | 12/1994 | Rollema | | |
| 5,444,527 A | 8/1995 | Kosaka | | |
| 5,747,671 A | 5/1998 | Hirota et al. | | |
| 5,856,200 A * | 1/1999 | Krause | | B01L 3/0244 |
| | | | | 422/82.05 |
| 5,982,289 A * | 11/1999 | Kingsley | | A61M 5/1689 |
| | | | | 340/602 |
| 6,032,016 A * | 2/2000 | Morigami | | G03G 15/2025 |
| | | | | 118/DIG. 1 |
| 2004/0171983 A1* | 9/2004 | Sparks | | A61M 5/16827 |
| | | | | 604/65 |
| 2007/0238954 A1* | 10/2007 | White | | A61B 8/481 |
| | | | | 600/407 |
| 2008/0221551 A1 | 9/2008 | Goodson et al. | | |
| 2009/0314101 A1 | 12/2009 | Levine | | |
| 2010/0160789 A1* | 6/2010 | Dilworth | | A61B 3/0025 |
| | | | | 600/476 |
| 2010/0309005 A1* | 12/2010 | Warner | | A61M 5/1689 |
| | | | | 340/606 |
| 2011/0009817 A1* | 1/2011 | Bennett | | A61M 5/168 |
| | | | | 604/93.01 |
| 2011/0046516 A1 | 2/2011 | Paz | | |
| 2011/0249255 A1* | 10/2011 | Bentien | | G01N 15/1459 |
| | | | | 356/51 |
| 2012/0095433 A1* | 4/2012 | Hungerford | | A61M 5/1689 |
| | | | | 604/500 |
| 2012/0179387 A1 | 7/2012 | Deng et al. | | |
| 2013/0083191 A1 | 4/2013 | Lowery et al. | | |
| 2013/0201471 A1* | 8/2013 | Bui | | G01N 21/59 |
| | | | | 356/73 |
| 2013/0201482 A1* | 8/2013 | Munro | | G01N 21/255 |
| | | | | 356/407 |
| 2013/0310990 A1* | 11/2013 | Peret | | F16M 11/041 |
| | | | | 700/282 |
| 2014/0116128 A1 | 5/2014 | Mantinband et al. | | |
| 2014/0273265 A1* | 9/2014 | Feingold | | G01N 27/08 |
| | | | | 436/163 |
| 2014/0318639 A1* | 10/2014 | Peret | | F16K 31/02 |
| | | | | 137/386 |
| 2017/0035342 A1 | 2/2017 | Elia et al. | | |

FOREIGN PATENT DOCUMENTS

| | | |
|---|---|---|
| JP | 07-333231 | 12/1995 |
| WO | WO 2009/142508 | 11/2009 |
| WO | WO 2014/052137 | 4/2014 |
| WO | WO 2016/084080 | 6/2016 |
| WO | WO 2017/021971 | 2/2017 |

OTHER PUBLICATIONS

Official Action dated Jan. 13, 2017 From the US Patent and Trademark Office Re. U.S. Appl. No. 15/228,115. (19 pages).
Thoroddsen et al. "High-Speed Imaging of Drops and Bubbles", Annual Review of Fluid Mechanics, 40: 257-285, Jan. 21, 2008.
Communication Relating to the Results of the Partial International Search dated Nov. 14, 2016 From the International Searching Authority Re. Application No. PCT/IL2016/050855. (10 Pages).
Restriction Official Action dated Sep. 15, 2016 From the US Patent and Trademark Office Re. U.S. Appl. No. 15/228,115.
AKI "Section2: AKI Definition: Chap.2.1: Definition and Classification of AKI", Kidney International Supplements, 2(Chap.2.1): 19-36, Feb. 29, 2012.
Labib et al. "Volume Management in the Crittically in Patient With Acute Kidney Injury", Critical Care Research and Practice, 2013(Art ID 792830): 1-8, Feb. 7, 2013.
Ralib et al. "The Urine Output Definition of Acute Kidney Injury is Too Liberal", Critical Care, 17(3): R112-1-R112-11, Published Online Jun. 20, 2013.
International Search Report and the Written Opinion dated Jan. 12, 2017 From the International Searching Authority Re. Application No. PCT/IL2016/050855. (19 Pages).
Official Action dated Jul. 26, 2017 From the US Patent and Trademark Office Re. U.S. Appl. No. 15/228,115. (27 pages).
Hoagg et al. "Sliding Window Recursive Quadratic Optimization with Variable Regularization", 2011 American Control Conference on O'Farrell Street, San Francisco, CA, USA, pp. 1-6, Jun. 29-Jul. 1, 2011.
International Preliminary Report on Patentability dated Feb. 15, 2018 From the International Bureau of WIPO Re. Application No. PCT/IL2016/050855. (13 Pages).
Official Action dated Feb. 16, 2018 From the US Patent and Trademark Office Re. U.S. Appl. No. 15/228,115. (29 pages).
Supplementary European Search Report and the European Search Opinion dated Jul. 23, 2018 From the European Patent Office Re. Application No. 15863318.0. (10 Pages).

\* cited by examiner

FIG. 10

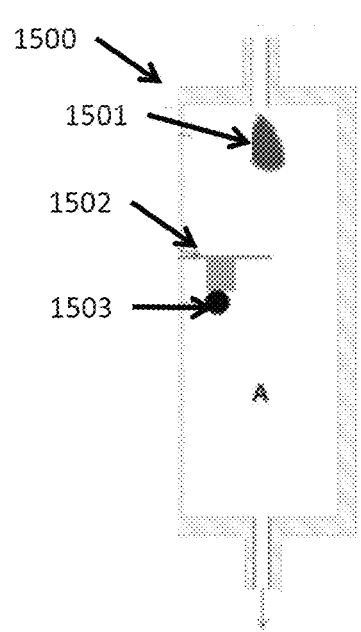
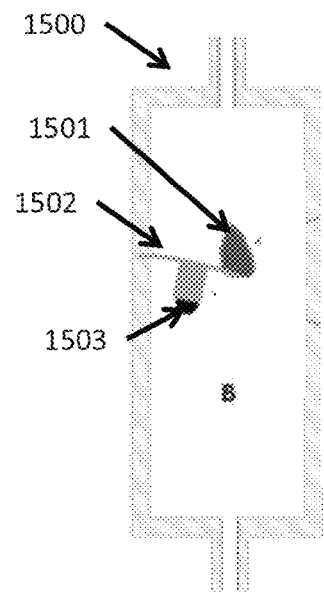
FIG. 15a  FIG. 15b
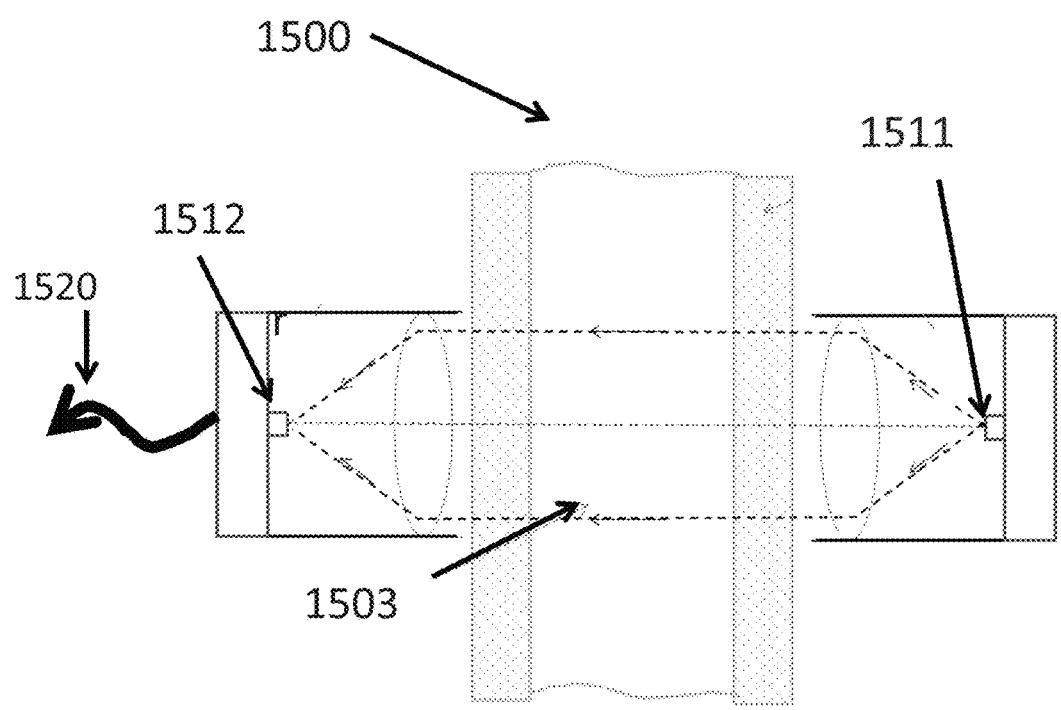
FIG. 15c

FIG. 20

Water

| Drops Upper | Rate Upper | Width Upper | Upper Idle | Drops Bottom | Rate Bottom | Width Bottom | Bottom Idle | Velocity | Cal Volume | Actual Volume | % Error | CC per Drop |
|---|---|---|---|---|---|---|---|---|---|---|---|---|
| 613 | 1576.42 | 147.18 | 324.09 | 613 | 1576.42 | 95 | 304.73 | 1841.73 | 38.28 | 38.1 | 0.48 | 0.062153344 |
| 620 | 1064.04 | 152.12 | 324.47 | 620 | 1064.04 | 100.74 | 305.68 | 1866.51 | 40.42 | 40 | 1.05 | 0.064516129 |
| 656 | 738.05 | 155.83 | 325 | 656 | 738.05 | 106.59 | 306 | 1897.45 | 43.62 | 43.8 | -0.42 | 0.066768293 |

Milk

| Drops Upper | Rate Upper | Width Upper | Upper Idle | Drops Bottom | Rate Bottom | Width Bottom | Bottom Idle | Velocity | Cal Volume | Actual Volume | % Error | CC per Drop |
|---|---|---|---|---|---|---|---|---|---|---|---|---|
| 587 | 889.8 | 144 | 324.04 | 587 | 889.8 | 99.87 | 303.97 | 1891.88 | 33.51 | 34 | -1.45 | 0.057921635 |
| 515 | 1217.35 | 137.9 | 323.01 | 515 | 1217.35 | 92.65 | 303 | 1843.23 | 28.30 | 28.4 | -0.36 | 0.055145631 |
| 483 | 1626.08 | 135.16 | 323.04 | 483 | 1626.08 | 89.82 | 303.05 | 1826.38 | 25.90 | 26 | -0.38 | 0.053830228 |
| 474 | 1898.87 | 132.92 | 324.49 | 474 | 1898.88 | 87.48 | 304.54 | 1814.08 | 24.86 | 25 | -0.57 | 0.052742616 |

Osmolite

| Drops Upper | Rate Upper | Width Upper | Upper Idle | Drops Bottom | Rate Bottom | Width Bottom | Bottom Idle | Velocity | Cal Volume | Actual Volume | % Error | CC per Drop |
|---|---|---|---|---|---|---|---|---|---|---|---|---|
| 606 | 2025.09 | 133.75 | 325.49 | 606 | 2024.54 | 90.16 | 301.58 | 1900.87 | 29.16 | 28.6 | 1.95 | 0.047194719 |
| 748 | 1510.82 | 136.59 | 328.15 | 748 | 1510.8 | 92.77 | 302.78 | 1920.89 | 36.67 | 36.1 | 1.57 | 0.048263032 |
| 824 | 1105.35 | 138.84 | 330 | 824 | 1105.35 | 94.34 | 301 | 1933.69 | 41.14 | 40.5 | 1.59 | 0.049150485 |
| 881 | 709.31 | 143.49 | 330.37 | 881 | 709.21 | 98.72 | 302.53 | 1966.2 | 45.16 | 45.2 | -0.08 | 0.051305335 |

Ensure

| Drops Upper | Rate Upper | Width Upper | Upper Idle | Drops Bottom | Rate Bottom | Width Bottom | Bottom Idle | Velocity | Cal Volume | Actual Volume | % Error | CC per Drop |
|---|---|---|---|---|---|---|---|---|---|---|---|---|
| 543 | 2024.61 | 139.84 | 324.04 | 543 | 2024.6 | 92.64 | 303.68 | 1949.77 | 26.89 | 25.9 | -0.04 | 0.049539595 |
| 549 | 1660.8 | 144.02 | 324.51 | 549 | 1660.79 | 95.05 | 303.57 | 1980.37 | 27.74 | 27.8 | -0.22 | 0.050637523 |
| 683 | 1400.56 | 146.21 | 323.57 | 683 | 1400.57 | 96.48 | 303.58 | 1993.05 | 35.04 | 34.8 | 0.68 | 0.050951684 |
| 789 | 816.3 | 153.52 | 322 | 789 | 816.22 | 99.51 | 301.02 | 2037.88 | 42.22 | 42.2 | 0.04 | 0.053485425 |

Jevity

| Drops Upper | Rate Upper | Width Upper | Upper Idle | Drops Bottom | Rate Bottom | Width Bottom | Bottom Idle | Velocity | Cal Volume | Actual Volume | % Error | CC per Drop |
|---|---|---|---|---|---|---|---|---|---|---|---|---|
| 664 | 1690.3 | 140.79 | 328.67 | 664 | 1690.2 | 93.28 | 300.36 | 1951.51 | 33.32 | 33.4 | -0.24 | 0.050301205 |
| 615 | 1565.51 | 137.88 | 331.73 | 615 | 1565.46 | 92.91 | 306.79 | 1926.76 | 30.54 | 31 | -1.49 | 0.050406504 |
| 626 | 1192.37 | 139.53 | 330.82 | 626 | 1192.57 | 94.72 | 306.82 | 1935.89 | 31.51 | 32.1 | -1.83 | 0.051277955 |
| 717 | 773.45 | 143.13 | 329.22 | 717 | 773.47 | 97 | 307.59 | 1959.08 | 36.95 | 37.4 | -1.19 | 0.052261785 |

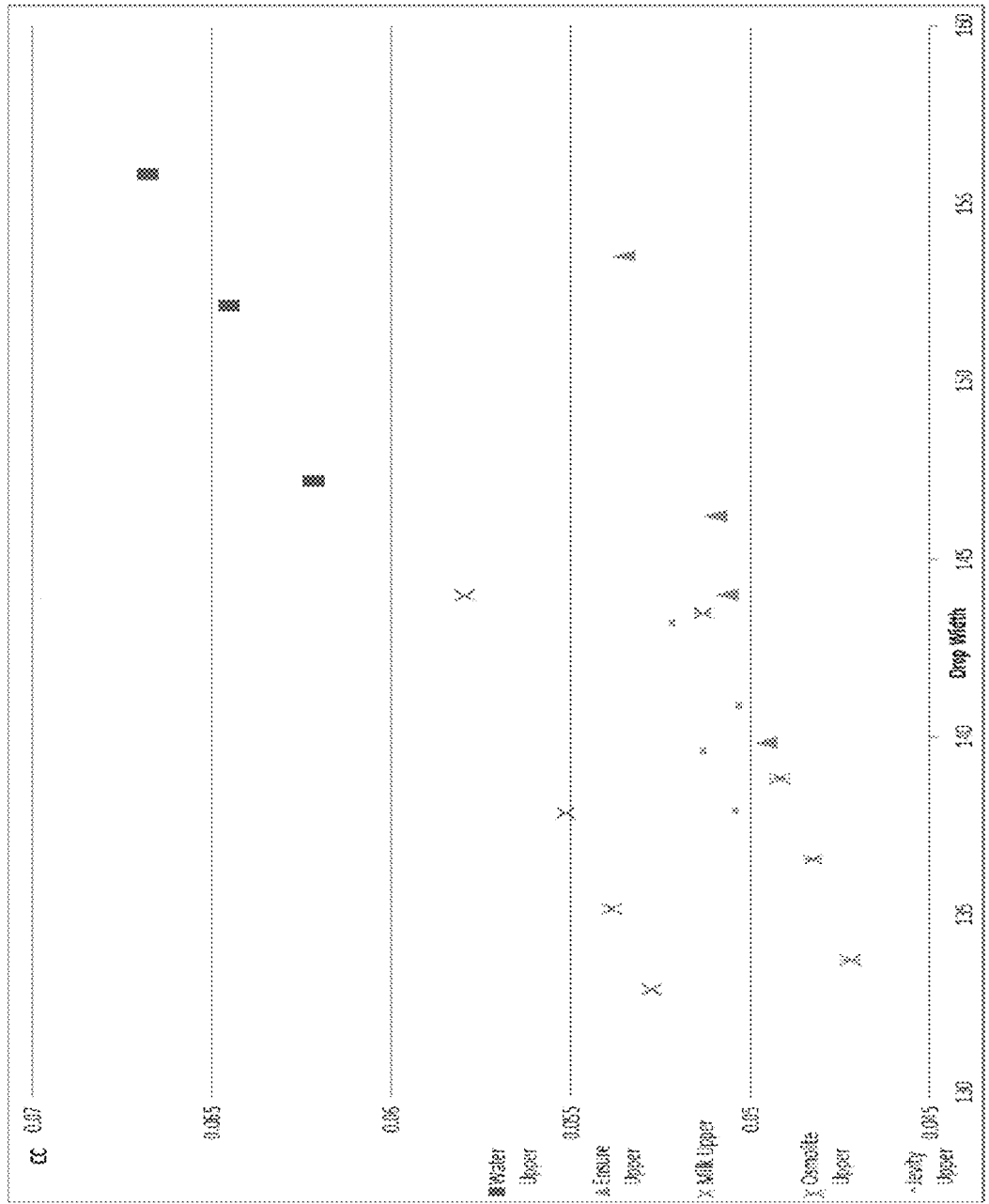
FIG. 21  Drop Width To CC

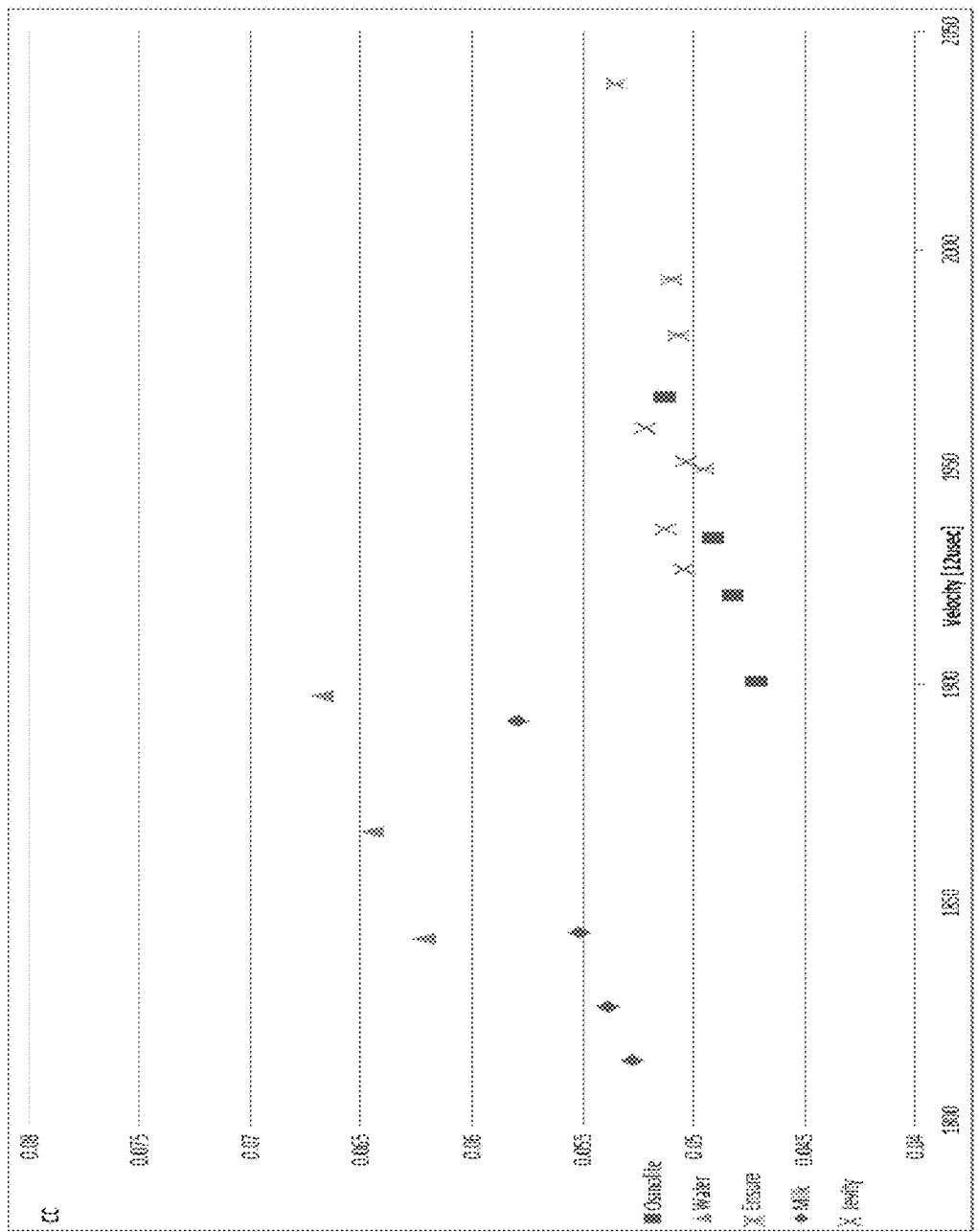
FIG. 22  Drop Velocity To CC

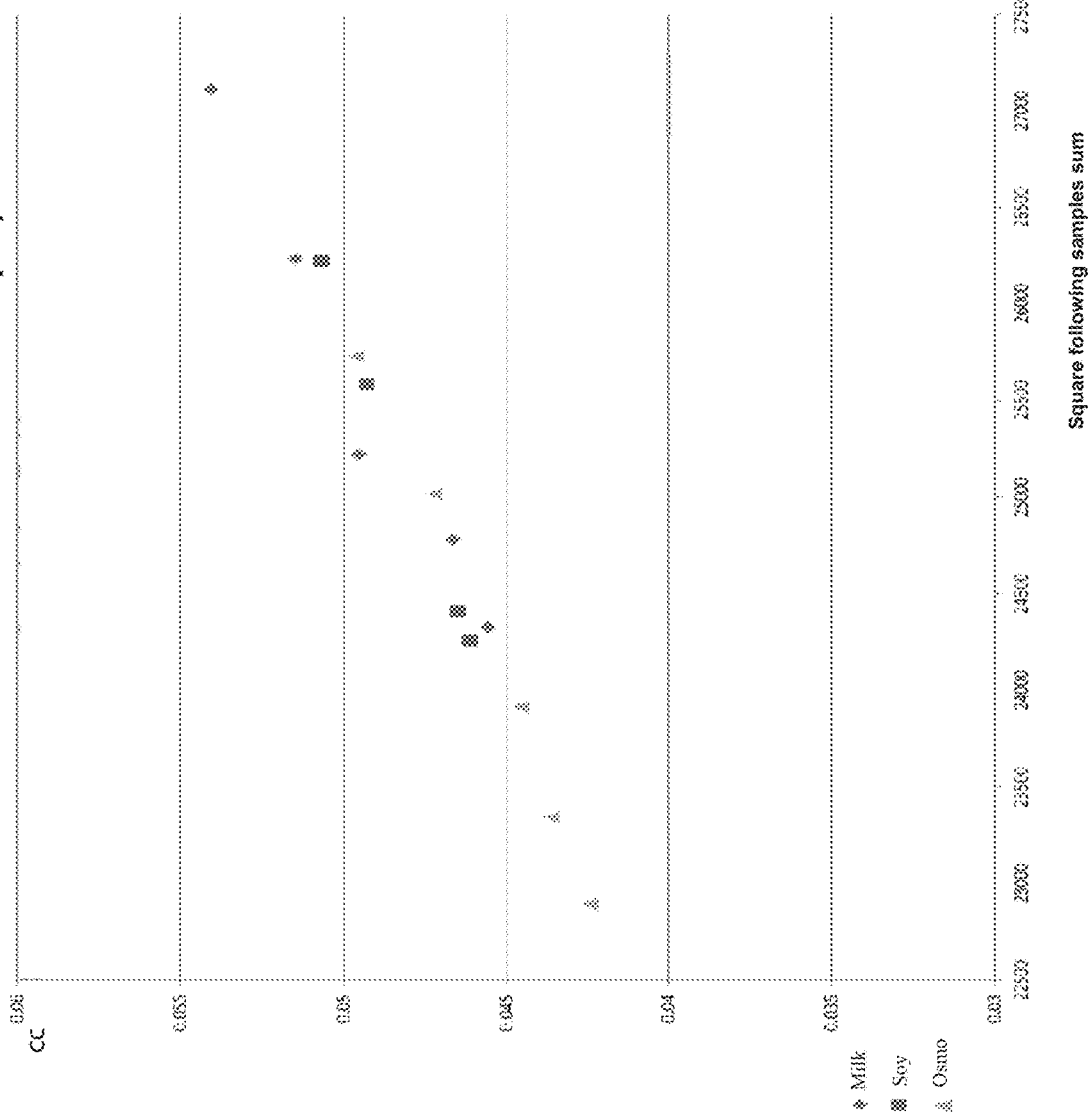

DROP AND DRIP MEASUREMENT

RELATED APPLICATION

This application claims the benefit of priority under 35 USC § 119(e) of U.S. Provisional Patent Application No. 62/083,575 filed on Nov. 24, 2014, the contents of which are incorporated herein by reference in their entirety.

BACKGROUND

The present invention, in some embodiments thereof, relates to a method of calculating volume of falling liquid drops and, more specifically, but not exclusively, to calculating volume of a drop based on output of electromagnetic radiation sensors that detects the drop.

Control of flow rates of liquids is essential in a variety of applications, including automatic feeding of patients via drip tubes. Flow of liquids may be accomplished by a gravity bag, or a peristaltic pump. A person may monitor whether the liquid is flowing by observing a transparent drip apparatus. However, visual monitoring is strictly qualitative, and does not supply information on flow rate or volume dispensed over time. There exist a need for an independent flow sensor that will provide real time flow quantitative data as well observable qualitative information, where the sensor that does not coming into contact with the feed thus does not require cleaning and sterilization.

SUMMARY

According to some embodiments of the present invention there are provided a method for calculating a volume of an individual falling drop of liquid by analyzing electromagnetic radiation (EMR) reception, the method comprising projecting electromagnetic radiation (EMR) from an EMR source, measuring the EMR using at least one EMR sensor when the EMR is partially interfered with by a drop falling between the EMR source and the EMR sensor, calculating a plurality of widths parallel to a vertical axis of the drop, each one of the plurality of widths is calculated according to a reception of a time correlated measured portion of the EMR, and calculating a volume of the drop by combining the plurality of widths and a velocity of the drop when the drop is falling between the EMR source and the EMR sensor.

Optionally measuring the velocity by detecting the drop at an upper location along a falling drop path at an initial time and at a lower location along the falling drop path at a later time, wherein the velocity is calculated according to a distance between the upper location and the lower location and a difference between the initial time and the later time.

Optionally the velocity is calculated by a falling body equation.

Optionally the volume is calculated by a curve fitting function combines volumetric data and respective velocity data of each of a plurality of exemplary drops.

Optionally the EMR is transmitted in one or more collimated beams wherein an area of the collimated beams exceeds an area of a vertical cross section of a center axis of the drop when the drop interferes with the EMR.

Optionally the EMR is transmitted as one or more collimated beams to a restricted horizontal planar area.

Optionally calculating instructions to control a feeding rate of a feeding device according to the volume.

Optionally the drop is one of a plurality of drops analyzed using the method; further comprising updating a count of the plurality of drops after the drop is detected.

According to some embodiments of the present invention there are provided a systems for calculating a volume of an individual falling drop by analyzing electromagnetic radiation (EMR) reception, the system comprising an electromagnetic radiation (EMR) source adapted to transmit an EMR, an EMR sensor positioned to capture the EMR when the EMR is interfered by a drop falling along a falling drop path, a program store storing code, a processor coupled to the program store and the EMR sensor for executing the stored code, the code comprising code instructions for acquiring a plurality of outputs of the EMR sensor, code instructions for calculating a plurality of widths along a vertical axis of the drop, each one of the plurality of widths is calculated according to one of the plurality of outputs, and code instructions for calculating a volume of the drop by combining the plurality of widths and a velocity of the drop when the drop is falling between the EMR source and the EMR sensor.

Optionally the EMR source is a light emitting device (LED).

Optionally the EMR source is positioned in parallel to the EMR sensor such that the EMR is reflected by the drop towards the EMR sensor.

Optionally an optical arrangement is configured to focus the EMR along an axis perpendicular to the EMR sensor reception plane.

Optionally the drop interferes with the EMR by at least partly blocking an amount of the EMR.

Optionally the code instructions for calculating the plurality of widths additionally comprising instructions for identifying a tail drop falling after the drop by an analysis of the plurality of outputs; further comprising adapting the volume according to a volume estimation of the tail drop.

Optionally the EMR sensor is a high resolution image sensor which captures a plurality of time referenced images of the falling drop, wherein the velocity is calculated according to a location of the drop in two or more the time referenced images.

Optionally the high resolution image sensor is selected from a group consisting of a complementary metal oxide semiconductor (CMOS) module, a charge couple device (CCD) module.

Optionally the code comprises code instructions to calculate a type of content of the drop by combining a plurality of time sequentially ordered calculated values of widths of the drop and a plurality of time sequentially ordered values of widths of a plurality of exemplary drops, the plurality of exemplary drops comprising of different content types of liquid, wherein a the drop is calculated to be of a one of a plurality of the types of liquid.

According to some embodiments of the present invention there are provided systems for calculating a volume of an individual falling drop by analyzing electromagnetic radiation (EMR) reception, the system comprising an electromagnetic radiation (EMR) source adapted to transmit an EMR, a protrusion, referred to herein as a plank, fixedly located in the path of the drop, wherein the plank is deflected when the drop strikes the plank, an EMR sensor, the sensor positioned such that the deflected plank interferes with a portion of the transmitted EMR, a computing device comprising an interface for receiving an output of the EMR sensor, a program store storing code, a processor coupled to the program store for executing the stored code, the code comprising, code instructions for digital sampling the output of the EMR sensor, code instructions for calculating a volume of the drop according to the digital data sample and a velocity of the drop.

Optionally a piezoelectric sensor fixedly is attached to the plank, wherein the piezoelectric sensor is deformed when the drop deflects the plank, and a volume of the drop is calculated according to an output of the piezoelectric sensor.

Optionally a magnet is attached to the plank and a coil located proximally to the magnet, wherein when a drop deflects the plank, the deflection causes a change in distance between the magnet and the coil, a current is induced in the coil, and a volume of the drop is calculated according to an induced current in the coil.

According to some embodiments of the present invention there are provided method for calculating a volume of an individual falling drop of liquid by analyzing electromagnetic radiation (EMR) reception, the method comprising projecting electromagnetic radiation (EMR) from an EMR source, positioning a protrusion, referred to herein as a plank, in a path of the drop, detecting a deflection of the plank when the drop strikes the plank, measuring an interference of a portion of the EMR by the deflected plank, calculating a momentum of the drop according to a time correlated measured portion of the EMR, and calculating a volume of the drop by combining the momentum of the drop and a specific gravity of the drop and a velocity of the drop when the drop first contacts the plank.

Optionally the EMR sensor is a member of a group consisting of an electro optical sensor, a photovoltaic sensor, a photodiode, a photo resister, a photo detector, a photoconductive device, a photo transistor, an optical sensor, a photon sensor, and an infrared radiation sensor.

Optionally an additional EMR sensor is positioned above or below the EMR sensor; wherein the velocity is calculated by combining outputs of the EMR sensor and the additional EMR sensor.

Unless otherwise defined, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 10 is an exemplary table of data obtained from an exemplary electromagnetic radiation measurement unit for calculating a volume of a drop of liquid, according to some embodiments of the present invention;

FIG. 15a is a simplified longitudinal side-view and partial cross-section of an exemplary electromagnetic radiation measurement unit for measuring a volume of a drop by deforming a plank, according to some embodiments of the present invention;

FIG. 15b is a simplified longitudinal side-view and partial cross-section of an exemplary electromagnetic radiation measurement unit for measuring a volume of a drop by deforming a plank when the plank is struck by the drop, in some embodiments of the present invention;

FIG. 15c is a simplified frontal view of an exemplary electromagnetic radiation measurement unit for measuring a volume of a drop by deforming a plank, in some embodiments of the present invention;

FIG. 20 is an exemplary table of data obtained from an exemplary electromagnetic radiation measurement unit for calculating a volume of a drop of liquid, according to some embodiments of the present invention;

FIG. 21 is a graphical representation of drop width data from table 2000, according to some embodiments of the present invention;

FIG. 22 is a graphical representation of drop velocity data from table 2000, according to some embodiments of the present invention; and FIG. 23 is a graphical representation of squared output of an EMR sensor data from table 2000, according to some embodiments of the present invention.

DETAILED DESCRIPTION

Figure 1:
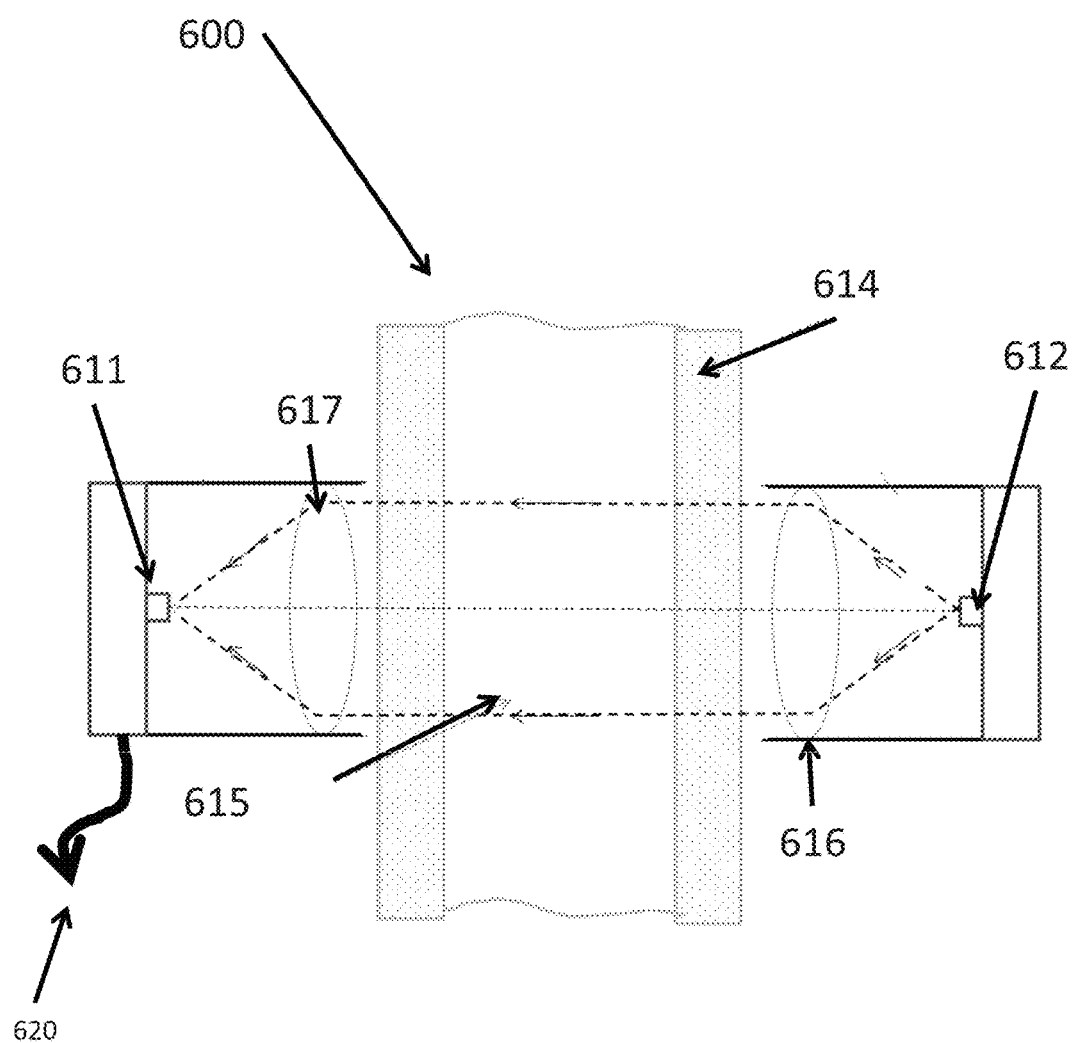
FIG. 1 is a schematic illustration of an exemplary component of a system for calculating a volume of a drop of liquid, according to some embodiments of the present invention.

The present invention, in some embodiments thereof, relates to a method of calculating a volume of a falling drop of liquid, referred to herein as a drop, and more specifically but not exclusively, to calculating a volume of a drop based on an output of electromagnetic radiation (EMR) sensors that detect the drop. A volume of fluid of all drops may be calculated by combining a count of the drops with the volume of the drops.

Measurement of volume of flow of liquids in a liquid drip system presents operational and technical challenges. The measurement apparatus ideally should be isolated from the liquid, in order to eliminate the need to clean and sterilize the apparatus. Existing solutions rely on estimating flow based on counting drops, but this system lacks accuracy due to variations in drop size and dripping rate. Solutions for measuring flow employ ultra sound sensors or thermal diffusion sensors attached to a pump. Such solutions do not measure drops, only continuous flow. According to some embodiments of the present invention, there are provided systems and methods for calculating a volume of individual drops, and cumulative flow volume of the liquid over time, using apparatus that is isolated from the liquid.

The present invention, in some embodiments thereof, is measuring a volume of a drop by summing volumes of a plurality of horizontal planar segments of the drop. The volume of each horizontal planar segment of a drop is calculated by measuring the EMR captured in a restricted horizontal planar area during a sequence of time intervals. As the drop falls, in each time interval a different horizontal segment of the drop interferes with a portion of EMR in the restricted horizontal planar area. The width of the horizontal segment of the drop is proportional to the amount of EMR that is interfered. The volume of the horizontal segment may be calculated when the width of the segment and the velocity of the segment are known.

The present invention, in some embodiments thereof, is based on a drop of liquid interfering with a preferably a collimated beam of EMR aimed at an EMR sensor. The output of the EMR sensor is proportional to the amount of EMR intercepted, such that the presence of the drop in front of the EMR sensor or at the EMR path ending at the EMR sensor changes the EMR received by the EMR sensor. An output of the EMR sensor is digitally sampled at a rate that produces a plurality of samples for each drop, wherein a value of each digital sample is proportional to a width of a horizontal segment of the drop. A velocity of the drop is calculated using a falling body equation. An equation using the width of the drop and the velocity of the drop as inputs is then used to calculate a volume of each segment of the drop. The volume of the drop is calculated by a sum the volumes of the segments.

The EMR may be for example a collimated beam of visible light. The falling drop may interfere with the EMR by blocking, partially blocking, absorbing, reflecting, diffracting and/or deflecting the EMR.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein may be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The present invention, in some embodiments thereof, comprises methods and systems for measuring the volume of a falling liquid drop and counting the drops over a period of time. The system comprises two components, an EMR measurement unit chamber, referred to herein as EMU, and a computing unit. The EMU and the computing unit may communicate with one another using a wired data connection and/or via a wireless data connection, referred to herein as a data connection.

The first component of the system, EMU, projects EMR, for example a beam of light, towards a falling liquid drop referred to herein as a drop, measures an interference in the EMR caused by the drop, and communicates the measurement via a data connection. The second component of the system is a computing unit, which is capable of receiving data signals from the EMU via the data connection, accumulates measurement data related to a single drop, combines the measurement data with the instantaneous velocity of the drop, and calculates a volume of the drop.

Figure 2:
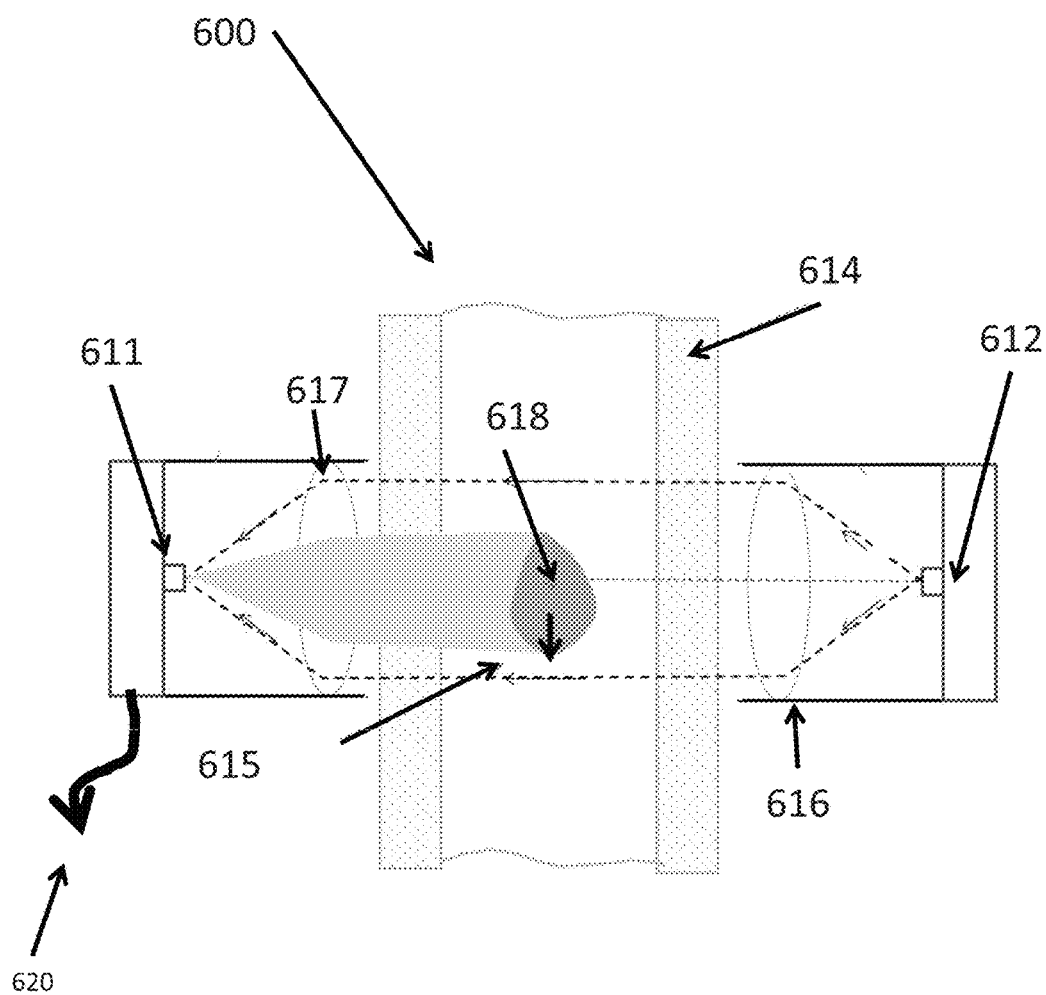
FIG. 2 is a schematic illustration of an exemplary component of a system for calculating a volume of a drop of liquid, with a drop of liquid interfering with a beam of electromagnetic radiation according to some embodiments of the present invention.

Reference is now made to FIG. 1 which is an exemplary illustration of EMU 600, according to some embodiments of the present invention. EMU 600 measures a width of a plurality of horizontal planar segments of a drop, which is communicated to a computing unit which calculates a volume of each segment and then computes a volume of the entire drop. The EMU comprises an EMR source 612, an EMR sensor 611, and a data connection 620. EMR source 612 emits a beam of EMR 615 towards EMR sensor 611. Shown in 615 is an EMR path between EMR source 612 and EMR sensor 611. Reference is now also made to FIG. 2, which is an exemplary illustration of EMU 600 with a drop 618 interfering with a portion of EMR 615 along the EMR path, according to some embodiments of the present invention. The amount of EMR interfered with by a horizontal segment of a drop is proportional to the width of the segment. The drop segment obscures a portion of the EMR proportional to the width thus effecting the photo sensor output signal.

Optionally, EMR source 612 projects an EMR beam collimated and focused on a restricted horizontal planar segment, as shown by lens 616 and lens 617. The collimated EMR and restricted horizontal path of the beam increases the accuracy of the proportionality of the output of the EMR sensor to the width of a horizontal segment of a drop.

Optionally, lens 616 and lens 617 focus the EMR 615 along an axis perpendicular to the reception plane of EMR sensor 611.

Figure 3:
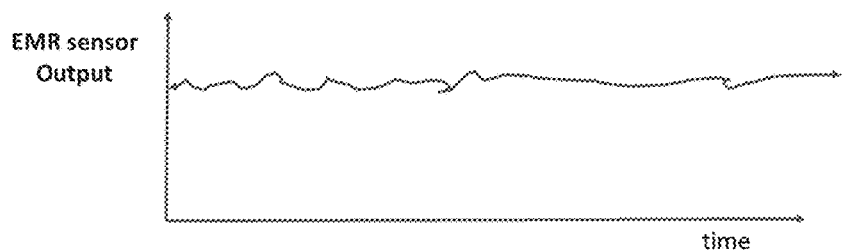
FIG. 3 is an exemplary graph of an output of an electromagnetic radiation sensor during a time period when no drops are detected, according to some embodiments of the present invention.
Figure 4:
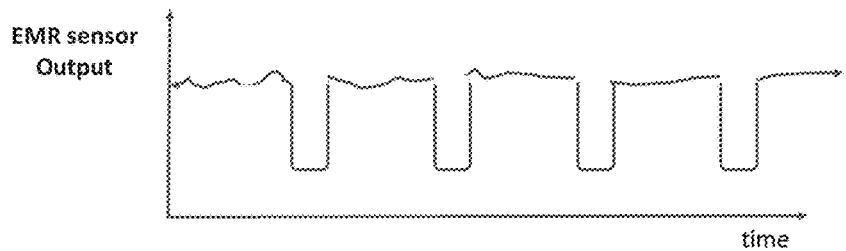
FIG. 4 is an exemplary graph of an output of an electromagnetic radiation sensor during a time period when a plurality of drops is detected, according to some embodiments of the present invention.

Reference is now also made to FIG. 3 which is an exemplary graph of an output of an EMR sensor 611 when no drop is detected during a period of time, according to some embodiments of the present invention. Reference is now also made to FIG. 4 which is an exemplary graph of an output of an EMR sensor 611 when a plurality of drops is detected during a period of time, according to some embodiments of the present invention.

Figure 5A:
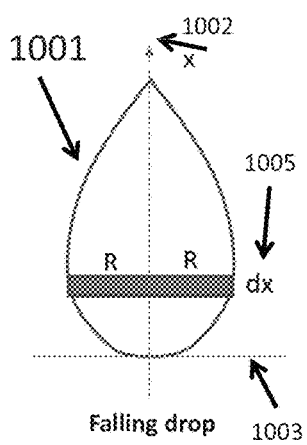
FIG. 5a is an exemplary diagram of a drop in a Euclidean plane, according to some embodiments of the present invention.
Figure 5B:
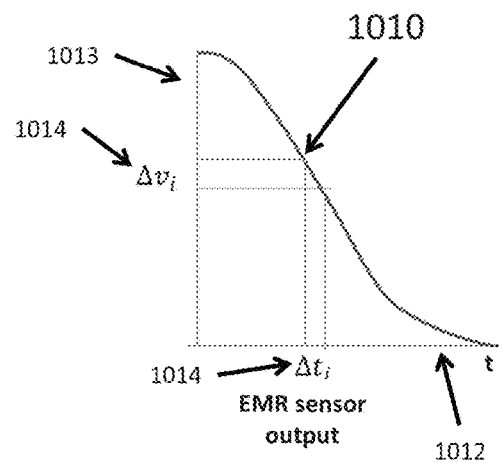
FIG. 5b is a graph of an output of an electromagnetic radiation sensor when a drop is detected, according to some embodiments of the present invention.

Reference is now also made to FIG. 5a which is an exemplary diagram of a drop 1001, according to some embodiments of the present invention. Reference is now also made to FIG. 5b which is a graph 1010 of the output of the EMR sensor 611 resulting from the drop 1001 interfering with a portion of EMR 615, according to some embodiments of the present invention. Drop 1001 is displayed on a Euclidian space wherein 1002 is the vertical axis and 1003 is the horizontal axis. As shown in graph 1010, 1012 is a vertical axis which represents time, and 1013 is a horizontal axis which represents an output of EMR sensor 611. As shown in dx 1005, dx denotes a horizontal segment of drop 1001 that interferes with a portion of EMR 615 and is correlated to time segment $\Delta t_i$. During time segment $\Delta t_i$ the output of EMR sensor 611 is reduced, as shown in $\Delta v_i$ 1014.

Figure 6:
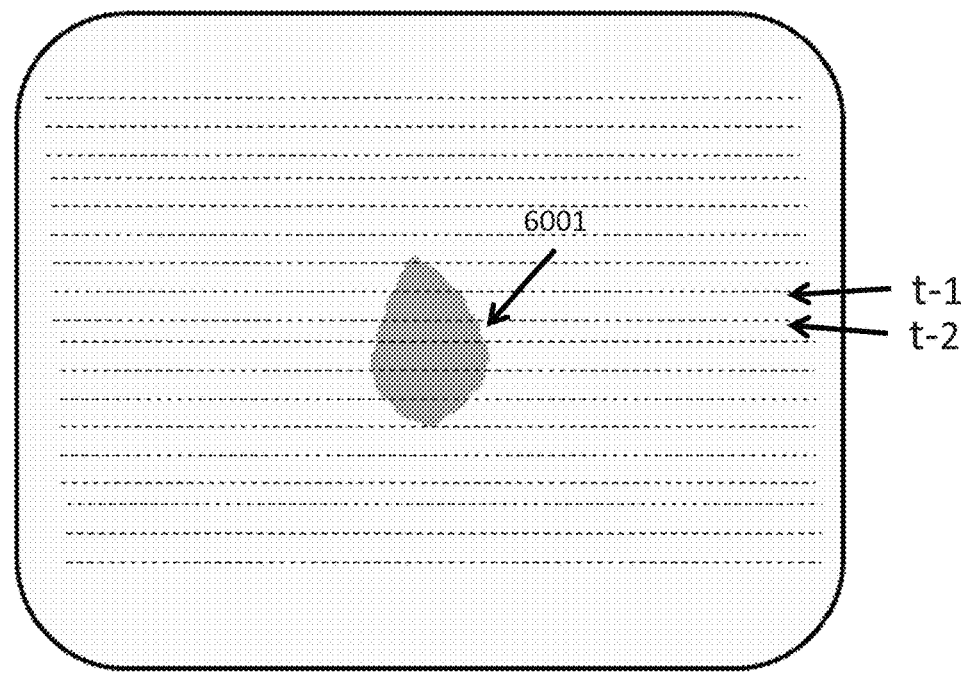
FIG. 6 is an exemplary illustration of a drop partially interfering with a path of EMR, wherein each dotted line represents an EMR beam path at a sequential point in time, according to some embodiments of the current invention.

Reference is now also made to FIG. 6, which is an exemplary illustration of a drop partially interfering with a path of EMR, wherein each dotted line represents an EMR beam path at a sequential point in time, according to some embodiments of the current invention. As drop 6001 falls a plurality of beams of EMR are partially interfered with over a period of time.

As described above, when the EMR beam is optionally collimated and restricted to a horizontal planar segment, as drop 6001 falls at any given point in time only a restricted horizontal segment of the drop is interfering with EMR projected towards EMR sensor 611. As shown in t-1, an exemplary beam of EMR is interfered with by a horizontal segment of drop 6001 at a specific point in time. At a later point in time, t-2 is interfered with by a different horizontal segment of the drop.

Figure 7:
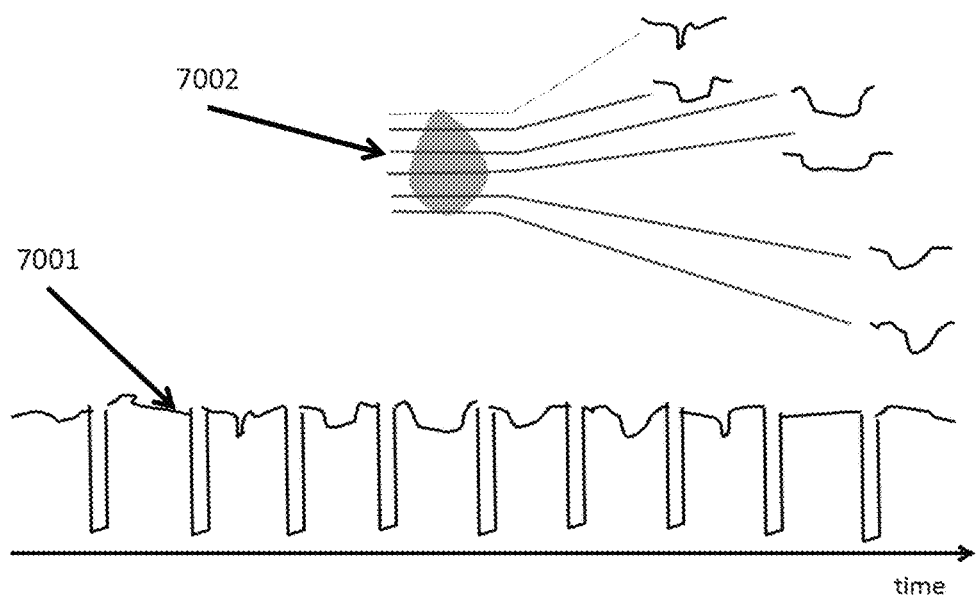
FIG. 7 is an exemplary illustration of a time sequence of a falling drop interfering with electromagnetic radiation beams during a period of time, according to some embodiments of the current invention.

Reference is now also made to FIG. 7, which shows 7001, an exemplary illustration of an output of sensor 611 during a period of time, according to some embodiments of the current invention. As shown in 7002, as each different horizontal segment of the drop interferes with a different beam of EMR at a different time, the resulting output of the EMR sensor reflects the width of the horizontal segment of the drop that interferes with the EMR beam.

As described above in 612 the EMR source projects EMR towards the EMR sensor 611, and a falling drop partially interferes with the EMR. Optionally, the EMR source may be positioned along the same vertical line as the EMR sensor, such that the projected EMR is reflected by the drop and the reflected EMR is received by the EMR sensor.

Figure 8:
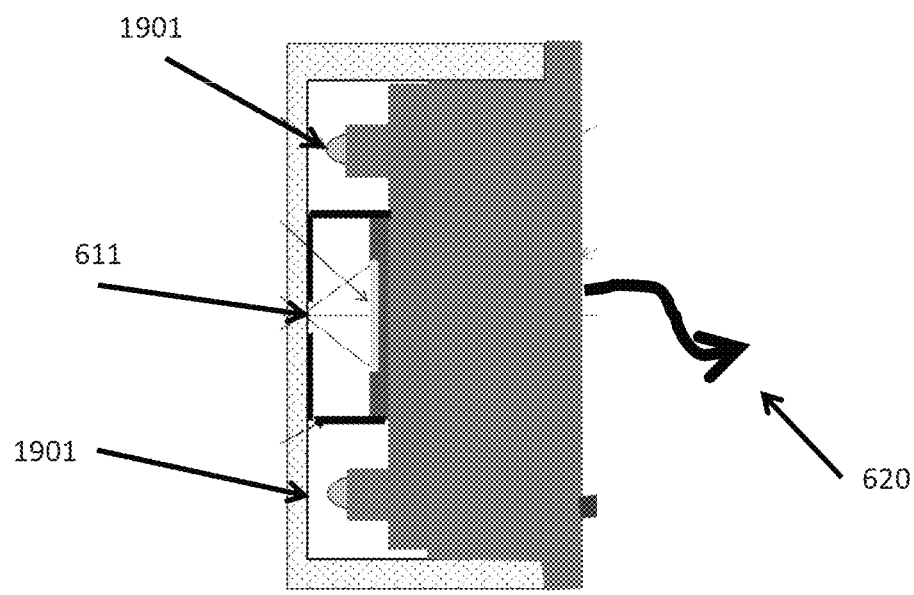
FIG. 8 illustrates a simplified longitudinal side-view and partial cross-section of an exemplary electromagnetic radiation measurement unit for measuring a volume of a drop where an electromagnetic radiation source and an electromagnetic radiation sensor are positioned along the same vertical line, according to some embodiments of the present invention.

For example, FIG. 8 is a simplified longitudinal side-view and partial cross-section of exemplary EMU where an EMR source and an EMR sensor are positioned along the same vertical line, according to some embodiments of the present invention. As shown in 1901, an EMR source is positioned above EMR sensor 611. Optionally a second EMR source 1903 is positioned below EMR sensor 611.

Figure 9:
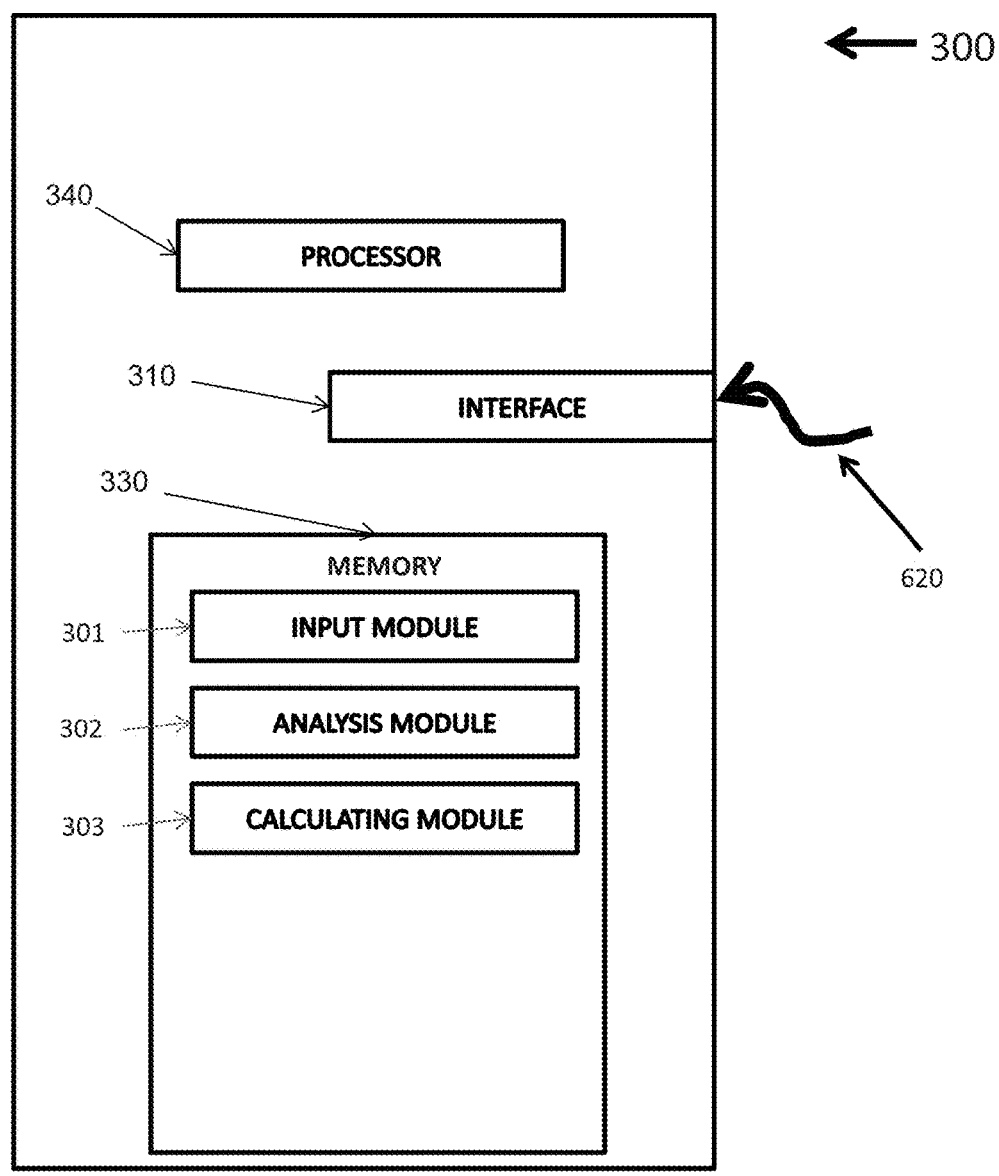
FIG. 9 is a schematic illustration of an exemplary element of a system for calculating a volume of a drop of liquid, according to some embodiments of the present invention.

As mentioned above, the second component of the system to measure a volume of a drop is a computing unit which is connected to the EMU by data connection 620. For example FIG. 9 is a schematic illustration of an exemplary computing unit 300 for calculating a volume of a drop, according to some embodiments of the present invention. Computing unit 300 comprises a processor 340 adapted to executing code instructions, an interface 310, a memory 330, and code instructions stored in memory 330. The code instructions may be functionally divided to an input module 301, an analysis module 302, and a calculating module 303. The data connection 620 of the EMU is connected to interface 310 which is adapted to receive analog data, analog current signals, digital data, and/or digital image data from EMR sensor 611 and/or any other EMR and/or image sensor. When the output of EMR sensor 611 is analog, interface 310 comprises an analog to digital converter, with a sampling rate that may be set by code executed from input module 301.

When executed, code 301 receives the digital samples from interface 310, stores the digital samples in memory 330, and adds a time stamp to the digital sample. Analysis module 302 contains code that when executed examines digital samples, detects a presence of a drop by a reduction in a value of the measured digital sample, and keeps a count of the number of drops detected. Calculating module 303 is a code that when executed receives from 302 a pointer to the digital samples in memory, and performs a calculation of a volume of the drop.

Optionally code of calculating module 303 when executed may also perform a calculation of volume of a drop based on a digital image of the drop. Optionally code of calculating module 303 when executed calculates a volume of a drop based on a width of the widest horizontal segment of the drop. Optionally, code of calculating module 303 when executed calculates a volume of a drop based on a momentum of a drop.

As mention above, the velocity of a drop is required in order to calculate a velocity for the drop. Optionally, an EMU comprising two EMR sensors is used to measure a velocity of a drop, in the manner explained now below.

Figure 11A:
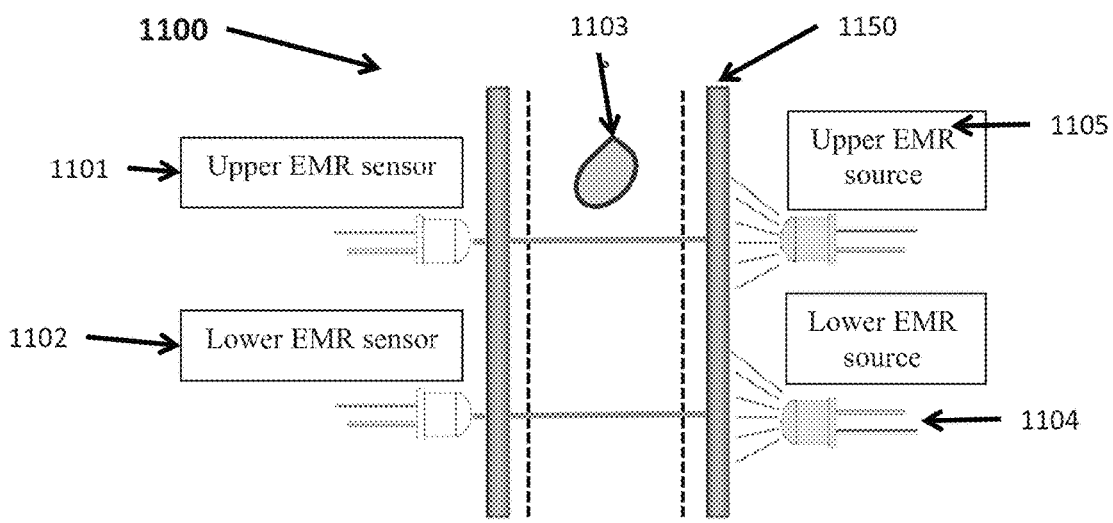
FIG. 11a illustrates a simplified longitudinal side-view and partial cross-section of an exemplary electromagnetic radiation measurement unit for measuring a volume of a drop with two electromagnetic radiation sensors, according to some embodiments of the present invention.

For example, FIG. 11a illustrates a simplified longitudinal side-view and partial cross-section of an exemplary EMU for measuring a volume of a drop with two EMR sensors, according to some embodiments of the present invention. A lower EMR sensor 1102 is positioned below an upper EMR sensor 1101. Optionally, a lower EMR source 1104 is positioned below an upper EMR source 1105 to transmit EMR towards lower EMR sensor 1102.

As seen in 1150 in FIG. 11a, the falling drop path transverses a chamber which is transparent or semi transparent. The material of the chamber may interfere with transmission of EMR from the EMR source 1105 to EMR sensor 1101. EMR sensors 1101 and/or 1102 are calibrated according to the interference to EMR of the material of the chamber.

Figure 11B:
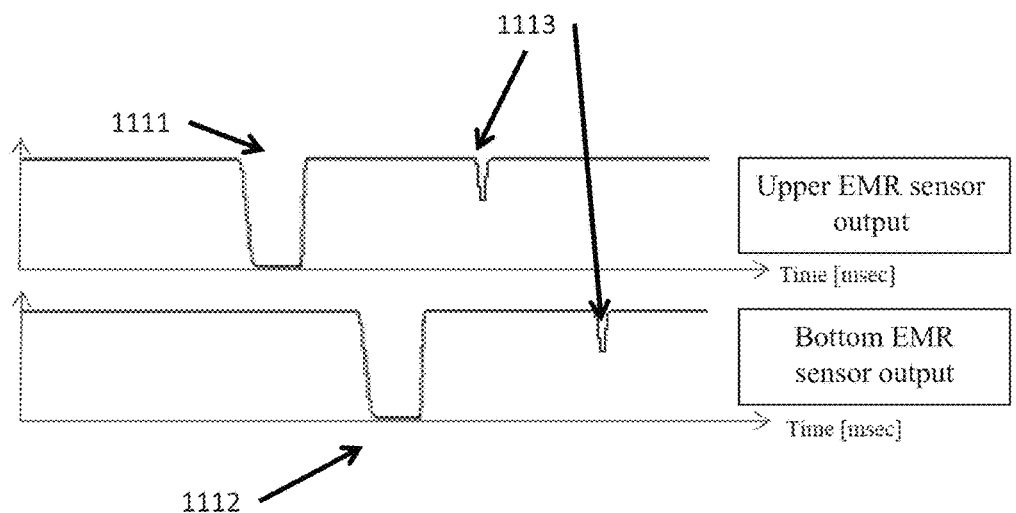
FIG. 11b is a graphical representation of the outputs of upper electromagnetic radiation sensor and lower electromagnetic radiation sensor, according to some embodiments of the present invention.

For example FIG. 11b is a graphical representation of the outputs of upper EMR sensor 1101 and lower EMR sensor 1102, according to some embodiments of the present invention. As shown in 1111 the output of upper EMR sensor 1101 is reduced when a drop falls between upper EMR sensor 1101 and EMR source 1105. As shown in 1112 the output of lower EMR sensor 1102 is reduced when the same drop falls between lower EMR sensor 1102 and lower EMR source 1104. The drop is detected by upper EMR 1101 sensor at an initial time, and detected by the lower EMR sensor 1102 at a later time. The velocity of the drop may be measured by the difference between the time the upper EMR sensor detects the drop and the time the lower EMR sensor detects the drop, combined with the distance between the lower EMR sensor and the upper EMR sensor.

Figure 12:
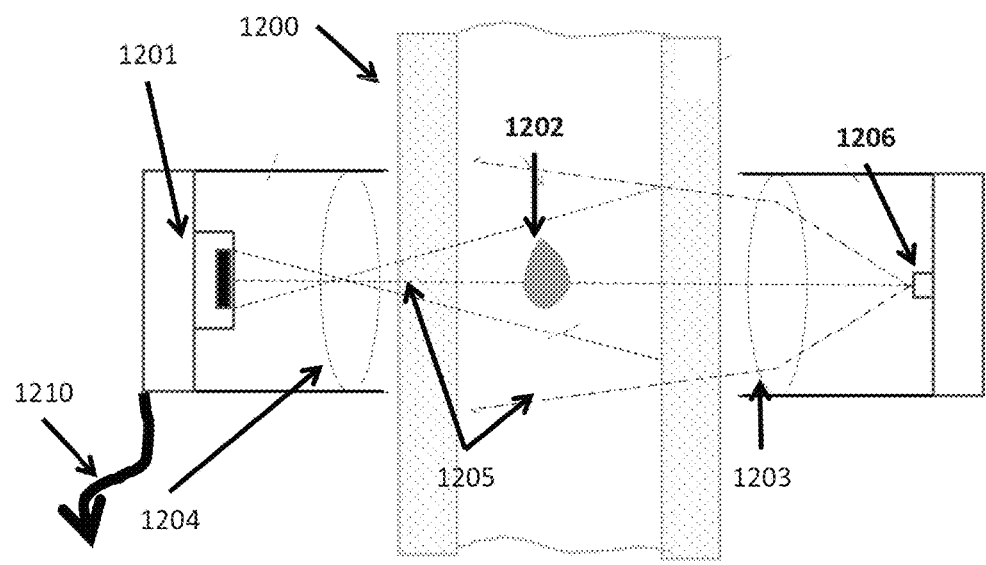
FIG. 12 is an exemplary electromagnetic radiation measuring unit for measuring a volume of a drop with an image sensor, according to some embodiments of the present invention.

Optionally, a high resolution image sensor may be used in place of an EMR sensor. The image sensor may be selected from a group consisting of but not restricted to complementary metal oxide semiconductor (CMOS) and charge couple device (CCD), or any other type of image sensor The image sensor generates a plurality of time referenced images of a drop, and the volume of the drop may be calculated from the geometry of the image, as described now below. For example, FIG. 12 is an exemplary EMU for measuring a volume of a drop with an image sensor in place of an EMR sensor, according to some embodiments of the present invention. EMU 1200 comprises EMR source 1206 which transmits EMR 1205, image sensor 1201, drop 1202, lens 1203 and lens 1204 which focus the EMR towards image sensor 1201, and data connection 1210. The output of image sensor 1201 is communicated to an interface 310 of computing unit 300. The drop is detected by code executed from analysis module 302. The volume of the drop is calculated by executing code from calculating module 303 which computes a volume based on a digital image of the drop.

Optionally the plurality of time referenced images may be used to calculate a velocity of a drop. Code instructions may be stored in calculating module 303 that when executed determine a location of a drop in two or more time referenced images. The code instructions when executed may combine a difference in the location of the drop in the two or more images and a difference in the time reference of the two or more images, and calculate the velocity of the drop.

Optionally the image of a drop may be used to identify the content type of the drop. For example, due to differences in fluid dynamics, a shape of a drop of water may differ from a shape and optical properties of a drop of milk. To enable a calculation of fluid type, a plurality of exemplary images of drops comprising different types of liquid content may be stored in memory 330. Code instructions may be stored in calculating module 303 that when executed compare one or more of the plurality of images of the drop with each of the plurality of exemplary images, and calculate a type of fluid content of the drop.

Figure 19:
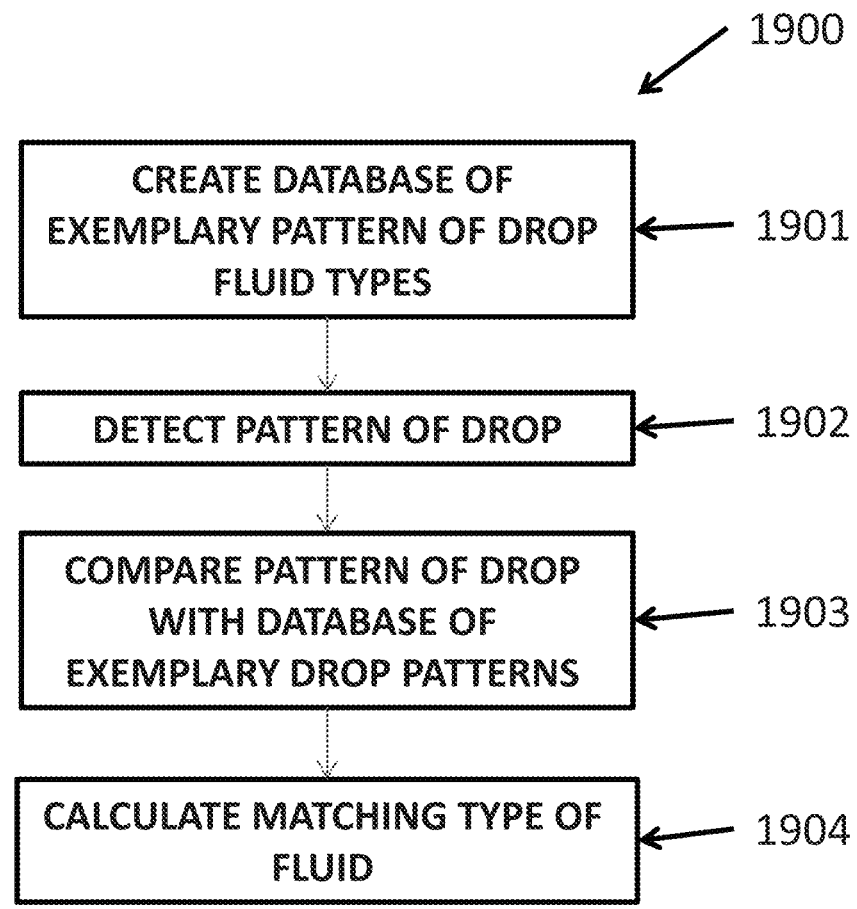
FIG. 19 is a flowchart of an exemplary method for calculating a content type of a drop of liquid, according to some embodiments of the present invention.

For example, FIG. 19 is a flowchart of an exemplary method 1900 for calculating a content type of a drop, according to some embodiments of the present invention. Exemplary process 1900 may be implemented using a image sensor 1201 as depicted in EMU 1200 in FIG. 12, and computing unit 300 in FIG. 9. As shown in 101 a plurality of exemplary images of drops of different types of fluid content is stored in memory 300 of computing unit 300. As shown in 102, an image of a drop is detected by code executed from analysis module 302. Execution of code stored in calculation module 303 compares the image of the drop with a plurality of exemplary images of drops of different types of fluid content, selects an exemplary image that is calculated to be the same fluid content type as the drop.

Optionally, the code in analysis module 302, referred to herein as analysis code, when executed may detect the presence of one or more smaller drops, referred to herein as tails, between detected drops. Due to the fluid dynamics of many types of liquids, there is a pattern wherein one or more droplets fall shortly after a drop falls. As shown in 1113 of FIG. 11b, after a drop is detected in the output of EMR sensor 611, a tail is then detected. Analysis code 302 when executed may include minimum thresholds to filter out noise. For example, a drop with a width smaller than a certain size, and/or a number of segment few than a certain number may be categorized as noise and the volume not calculated. Analysis code 302 when executed may reduce the thresholds described above for a period of time after each detected drop in order to not ignore the expected pattern of tails.

Figure 13:
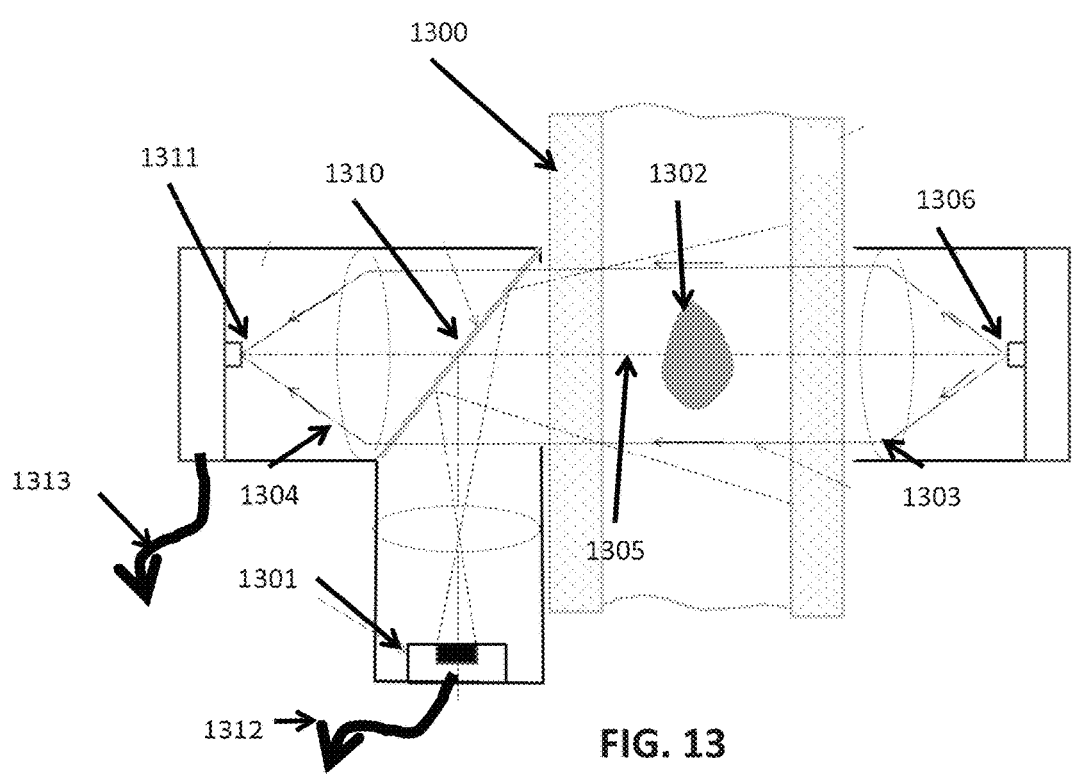
FIG. 13 is an exemplary electromagnetic radiation measurement unit for measuring a volume of a drop with an image sensor, and counting the number of drops with an electromagnetic radiation sensor, according to some embodiments of the present invention.

Optionally, an EMR sensor to count the number of drops may be added to exemplary EMU 1200 in addition to an image sensor. For example, FIG. 13 depicts an exemplary EMU for measuring volume of a drop with an image sensor, and counting the number of drops with an EMR sensor, according to some embodiments of the present invention. EMU 1300 comprises EMR source 1306 which transmits EMR 1305, lens 1303 which focus the EMR, lens 1304 which focus the EMR, beam splitter 1310 which divides EMR between EMR sensor 1311 and image sensor 1301, drop 1302, data connection 1313, and EMR cable 1312. The volume of a drop is calculated by computer unit 300 in the same manner as described above with EMU 1200. In addition, EMR cable 1312 transmits analog data to interface 310, and code executed from analysis module 302 detects a presence of a drop, and records the number of drops detected.

Figure 14:
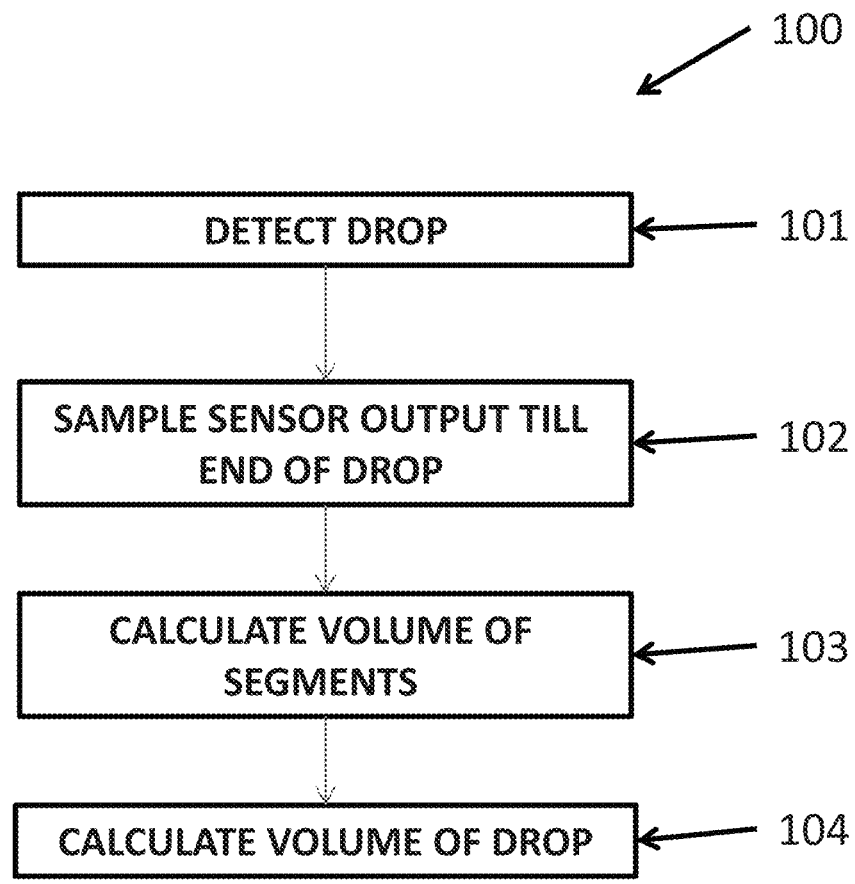
FIG. 14 is a flowchart of an exemplary method for calculating a volume of a drop of liquid, according to some embodiments of the present invention.

As described above, the system to calculate a volume of a drop comprises an EMU and a computing unit. For example, FIG. 14 is a flowchart of an exemplary method 100 for calculating a volume of a drop, according to some embodiments of the present invention. Exemplary process 100 may be implemented using a EMU as depicted in EMU 600 in FIG. 1 and computing unit 300 in FIG. 9. As shown in 101 a drop is detected by measuring an EMR reception change at an EMU. For example, when a drop partially interferes with EMR 615, and the partially interfered EMR 615 is digitally sampled by interface 310, and compared to a level of EMR measured when no drop is present. The presence of a drop is detected by a reduction in the output of the EMR sensor.

As shown in 102, the output of the EMR sensor 611 is sampled and converted to a digital number by code executed from input module 301 and/or by EMR sensor 611. Each digital number is proportional to a width of a horizontal segment of the drop. As the sampling rate increases, the height of the horizontal segment decreases, and the shape of the horizontal segment approaches the shape of a cylinder. The digital samples are stored in memory 330. The sampling and converting of EMR sensor output by 102 is repeated until the drop is no longer detected. As the drop falls through the path of the EMR beam 615, digital samples are collected at a rate that allows between 100 and 200 digital samples for each drop. The value of each digital sample is proportional to a width of a horizontal segment of the drop As shown in 103, processor 300 executes code instructions 303 to calculate a volume of a horizontal segment of the drop. The inputs for the calculation comprise the width of horizontal segment of the drop and instantaneous velocity of the drop. As shown in 104, processor 300 executes code instructions 303 to calculate a volume of the drop by integrating the volumes of the horizontal segments of the drop.

Optionally, the calculation of the volume of each segment may be performed when the digital data for each segment is received. Optionally all the data samples for a drop are stored, and then the calculation of the volume of the segments is performed.

The equations for the calculation of the volume of a horizontal drop segment and the calculation for the volume of a drop are now shown below. Equation 1 shows an exemplary equation for volume of a horizontal segment of a drop. The shape of the horizontal segment approaches the shape of a cylinder. For example, calculating module 104 may store code instructions to implement Equation 1.

$$V_i = \frac{\pi k}{4c} \frac{(\Delta v_i)^2}{\Delta t_i} \qquad \text{Equation 1}$$

Note that Equation 1 is derived in the following manner:

$$\Delta A_i = 2\pi R_i \Delta x_i = 2\pi R_i c \Delta t_i$$

$$[A] \; R_i = \frac{k}{2c} \frac{\Delta v_i}{\Delta t_i}$$

$$V_i = \pi R_i^2 \Delta x = \pi R_i^2 c \Delta t_i = [B] \; \pi c \Delta t_i \left( \left( \frac{k}{2c} \frac{\Delta v_i}{\Delta t_i} \right) \right)^2$$

$$V_i = \frac{\pi k}{4c} \frac{(\Delta v_i)^2}{\Delta t_i}$$

where
$x_i$ denotes height of a drop segment;
c denotes instantaneous velocity of a drop;
$t_i$ denotes time between digital samples;
$A_i$ denotes area of a drop segment;
$v_i$ denotes output of an EMR sensor during a digital sample;
$R_i$ denotes a radius of a drop segment;
$V_i$ denotes volume of a drop segment;
V denotes volume of a drop;
i denotes index of drop segments; and
n denotes total number of segments comprising a drop.
k denotes a constant to be calculated once depending on the optics geometry Note that Equation 1 is a formula for volume of a horizontal segment of a drop and the expression for R is inserted from A into B.

By integrating Equation 1 for all segments of the drop, we derive equation 2, the equation for the volume of the drop.

$$V = \frac{\pi k}{4c} \sum_{i=1}^{i=n} \frac{(\Delta v_i)^2}{\Delta t_i} \qquad \text{Equation 2}$$

The constant k may be changed according to the selected EMR beam width.

Optionally the EMR beam may be larger in area than the drop.

Optionally the instantaneous velocity of the drop may be calculated by a falling body equation. Inputs to the falling body equation comprise the distance traveled and the gravitational constant. Equation 3 shows the equation for instantaneous velocity of a falling body.

$$v_i = \sqrt{2gd} \qquad \text{Equation 3:}$$

Where $V_i$ denotes instantaneous velocity, g denotes gravitational constant and d denotes distance the falling body has fallen.

Optionally the output of EMR sensor 611 may be used to count a plurality of drops, such that a total number of drops may be calculated. Optionally, the volume of the individual drops may be combined to calculate a total volume of liquid. For example, in a liquid feeding device, the method described above may be used to record the volume of liquid that has been fed to a patient via a drip feeding unit.

Optionally, a device for delivering liquids, for example for feeding a patient, may be controlled by the method described above and execute a monitoring of volume flow of liquid in a feeding system in real time. Instructions to increase or decrease a rate of liquid flow may be calculated by combining a calculation of the total volume of liquid flowing over a time period and a desired rate of liquid flow.

Figure 10:
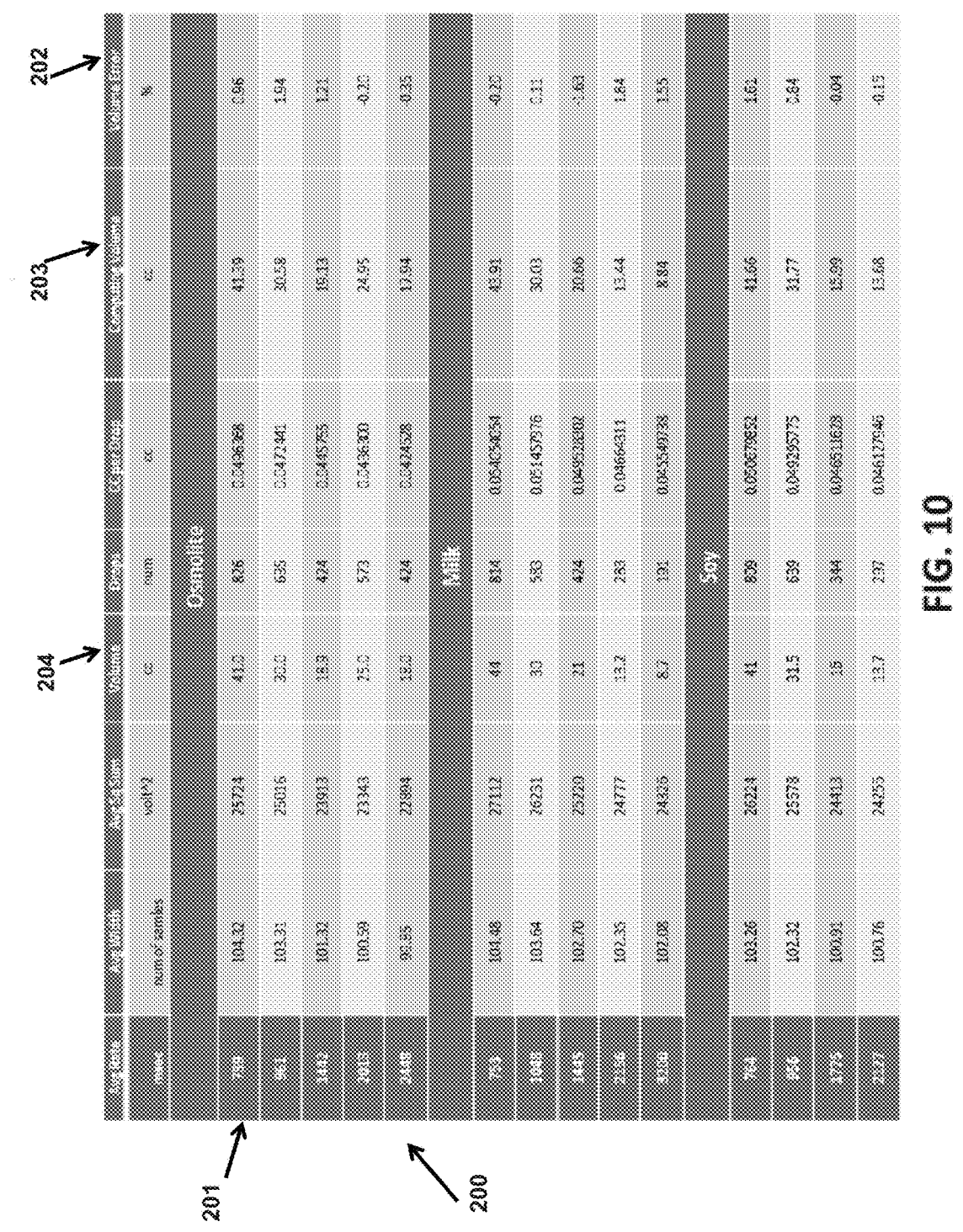

The method and system described above calculate volume of a drop. The accuracy of the method and system are described now below. For example FIG. 10 is an exemplary table of data obtained using an exemplary EMU 600, according to some embodiments of the present invention. As shown in 201, each row in table 200 is a series of data for a plurality of drops of liquid. As shown in 203, an average of the volume of the drops in a series are computed using the method and system described above. As shown in 204 an average volume of the drops in the series is measured without using the method and system described above by aggregating all the drops, measuring the total volume of the drop aggregate and dividing by the number of drops in the series.

As shown in 202, the percentage of error between the computed volume 203 and actual volume 204 for all rows is less than 2%. In half of the rows, the error is less than 1%.

As described above, the method of calculating the volume of drops is to measure the width of a plurality of horizontal segments of a drop, and combine the volume of all the horizontal segments to calculate the volume of the drop using Equation 1.

Optionally, the calculation for the volume of the drop may be constructed by collecting a plurality of exemplary data of a plurality of drops, and constructing a non linear equation to fit the exemplary data, as described below.

Optionally, the volume of a drop is calculated by a nonlinear equation derived by a curve fitting process, for example "CurveExpert Professional", "DataFit" and/or "Lab Fit". The curve fitting process combines a plurality of inputs for a plurality of drops to construct an equation that when executed calculates the volume of a drop.

As described above, the curve fitting process requires a plurality of data for a plurality of drops. For example FIG. 20 is an exemplary table 2000 of data for a plurality of exemplary drops, according to some embodiments of the present invention. As shown in 2001, each row in table 2000 is a series of data for a plurality of drops. The inputs to the curve fitting process comprises the maximum width of the drop, the rate of drops, the instantaneous velocity of the drop, and an independently measured volume of each drop. The independently measured volume of each drop is calculated by measuring the collective volume of all the drops in a series, and dividing by the number of drops in the series.

The method of curve fitting process constructs a non linear equation. The nonlinear behavior of the data of table 2000 presented graphically in FIG. 21 which is a graphical representation of data from table 2000 that plots the width of a drop on the horizontal axis and the amount of cubic centimeter (cc) in a drop on the vertical axis, according to some embodiments of the present invention.

Reference is now also made to FIG. 22 which is a graphical representation of non linear nature of the data from table 2000 that plots the drop velocity on the horizontal axis and the amount of cc in a drop on the vertical axis, according to some embodiments of the present invention.

Reference is now also made to FIG. 23 which is a graphical representation of non linear nature of the data from table 2000 that plots the square of the measured output of an EMR sensor when a drop is detected on the horizontal axis and the amount of cc in a drop on the vertical axis, according to some embodiments of the present invention.

The curve fitting process may construct a nonlinear equation to calculate a volume of a drop based on the data from table 20. The nonlinear equation calculates the volume of drops based on the input of a single width of the widest horizontal segment of a drop, and drop velocity. Equation 4 is an exemplary equation to calculate a volume of a drop constructed by curve fitting process, according to some embodiments of the present invention.

$$Y = A \cdot e^{\frac{B}{X2} + C \cdot X1} + D \cdot X2 \qquad \text{Equation 4}$$

Where:
Y denotes volume of a drop;
$X_1$ denotes widest width of drop;
$X_2$ denotes drop velocity; and
A, B, C, D=constants In the system described above, a volume of a drop may be calculated by measuring an EMR beam that the drop partially interferes with. Alternatively, the volume of a drop may be measured using an EMU that has a protrusion that is deflected by the falling drop. A plurality of methods of measuring the deflection of the protrusion are now described below.

A volume of a drop may be calculated by a method comprising deflecting a semi elastic protrusion, referred to herein as a plank, according to some embodiments of the present invention. A plank is fixedly placed in the path of a drop. When the drop strikes the plank, the plank is deflected downwards. Within limited deflection range, the deflection of the plank is linearly proportional to the momentum of the drop, wherein momentum equals mass times velocity. Volume of a liquid may be calculated by combining a specific gravity of the liquid with a mass of the liquid. A beam of EMR is partially interfered when the plank is deflected may be used to calculate the volume of the drop in a manner similar to EMU 600.

Reference is now made to FIG. 15*a* which illustrates a simplified longitudinal side-view and partial cross-section of an exemplary EMU for measuring a volume of a drop by deforming a plank, according to some embodiments of the present invention. EMU 1500 is equipped with plank 1501, but is otherwise similar to EMU 300 in all regards. As shown in EMU 1500 plank 1502 is fixedly positioned in the path of drop 1501.

Reference is now made to FIG. 15*b* which shows EMU 1500 when plank 1502 is struck by drop 1501 and is deflected into the path of EMR beam 1503, according to some embodiments of the present invention. Not shown in FIG. 15*a* is EMR source 1510 and EMR sensor 1511.

Reference is now made to FIG. 15*c* which illustrates a frontal view of EMU 1500. As shown in 1500, EMR source 1511 projects a beam of EMR 1503 towards EMR sensor 1512, according to some embodiments of the present invention. Data connection 1520 is shown, not shown in FIG. 15*c* is plank 1501.

Figure 18:
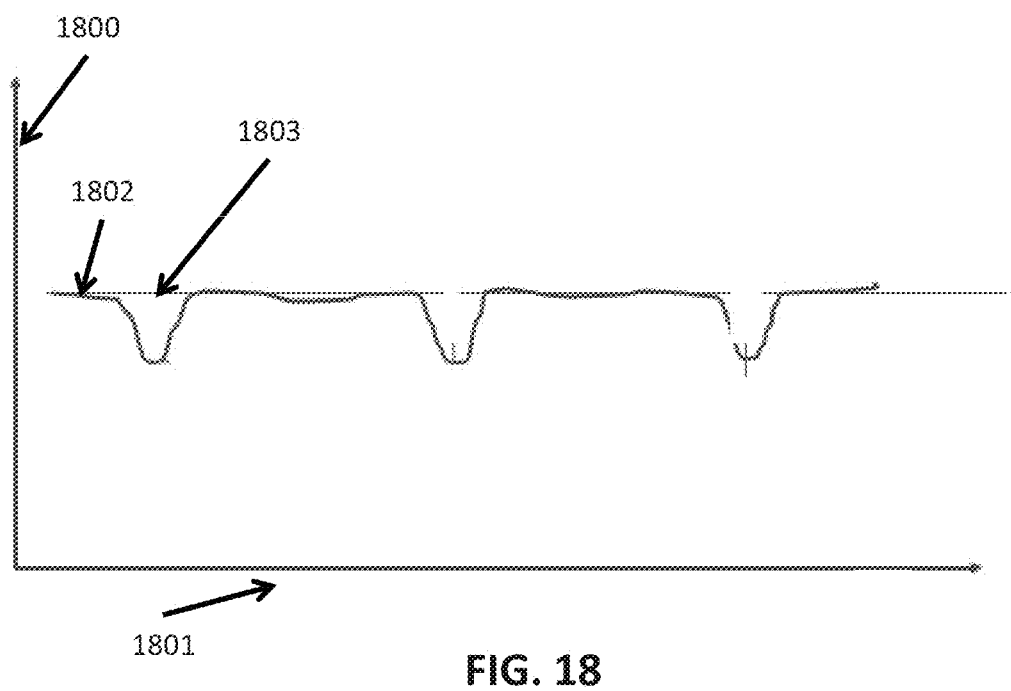
FIG. 18 is an exemplary graph of an output of an electromagnetic radiation sensor of an exemplary electromagnetic radiation measurement unit for measuring a volume of a drop by deforming a plank according to some embodiments of the present invention.

Reference is now made to FIG. 18 which is a exemplary graph of an output of EMR sensor 1512, according to some embodiments of the present invention. 1800 is a vertical axis which represents a level of an output of 1512, and 1801 is a horizontal axis which represents the time axis. The output of EMR sensor 1512 is at a higher level at 1802 when plank 1502 is not deflected, and the output of 1512 goes down as shown in 1803 when a drop partially interferes with EMR 1503.

An output of EMR sensor 1311 is connected to interface 310 of computing unit 300. Computing unit 300 operates substantially as described above. Memory module 301 and analysis module 302 function as described above. Calculating module 303 stores code instructions that when executed search for the digital sample from a drop with the lowest value, indicating maximum deflection, which is normalized to an amount of momentum. An instantaneous velocity of the drop is calculated using the falling body equation as described above, or the instantaneous velocity is measured using EMU 1100 as described above. Code instructions when executed calculate the mass of the drop by combining instantaneous velocity with momentum measured by plank deflection. The formula stating momentum equals mass times velocity is used to calculate the mass of the drop, and the volume may be derived from the mass for each type of liquid. A flow rate of drops may be calculated by Equation 5.

$$\dot{m} = m_d f_d \quad \text{Equation 5:}$$

where
$\dot{m}$=mass of flow
$m_d$=mass of drop
$f_d$=frequency of drops
$\Delta v$=output of EMR sensor $$m_d \propto \Delta v$$

$$f_d = 1/T$$

Optionally, a piezoelectric sensor is attached to plank 1502, such that when a drop deflects plank 1502, the piezoelectric sensor is deformed. Volume of drops in EMU 1500 may be calculated by the output of the piezoelectric sensor which is attached to interface 310 in a manner similar to EMU 1500.

Figure 16:
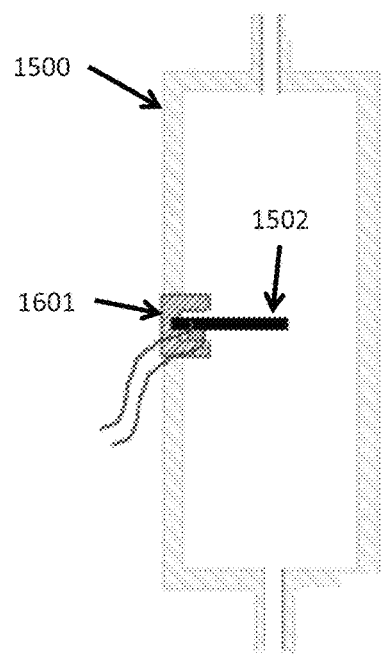
FIG. 16 is a simplified longitudinal side-view and partial cross-section of an exemplary electromagnetic radiation measurement unit for calculating a volume of drops with a piezoelectric sensor, according to some embodiments of the present invention.

Reference is now made to FIG. 16 which illustrates a simplified longitudinal side-view and partial cross-section of exemplary EMU 1500 for calculating a volume of drops with a piezoelectric sensor 1601, according to some embodiments of the present invention. Piezoelectric sensor 1601 is attached to plank 1502, such that when a drop deflects plank 1502 piezoelectric sensor 1601 is compressed. An output of 1601 is connected to interface 310. The output of 1601 is proportional to the momentum of a drop. Computing unit 300 calculates the volume of a drop in a manner similar to when attached to EMU 1500 above.

Optionally, a coil is positioned proximal to plank 1502, and a magnet is attached to plank 1502, such that when a drop deflects plank 1502, the distance between the magnet and the coil is changed, and a current in induced in the coil. Volume of drops in EMU 1500 may be calculated by the output of the coil.

Figure 17:
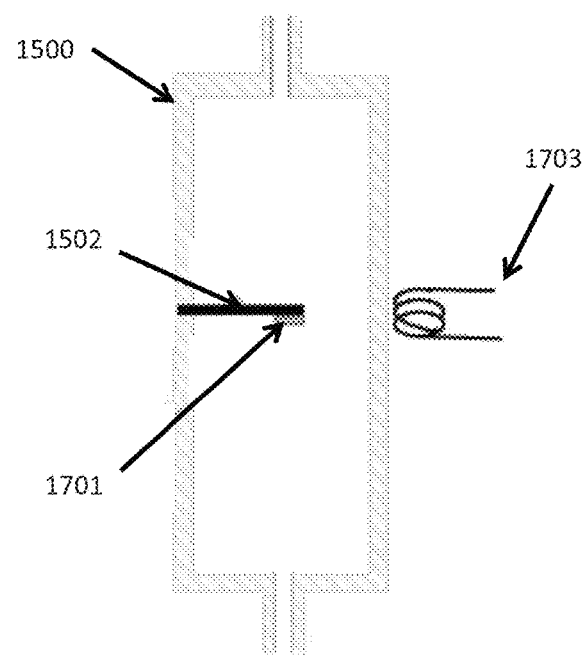
FIG. 17 is a simplified longitudinal side-view and partial cross-section of an exemplary electromagnetic radiation measurement unit for calculating a volume of drops with a magnet and a coil, according to some embodiments of the present invention.

Reference is now made to FIG. 17 which illustrates a simplified longitudinal side-view and partial cross-section of exemplary EMU 1500 for calculating a volume of drops with a magnet and a coil, according to some embodiments of the present invention. A magnet 1701 is attached to plank 1502 and a coil 1703 is located proximal to magnet 1501.

When a drop deflects plank 1502, a current is induced in coil 1703 by the movement of magnet 1701. An output of 1701 is connected to interface 310. The output of 1701 is proportional to the mass of a drop. Computing unit 300 calculates the volume of a drop in a manner similar to when attached to plank EMU 1500.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant sensors and computing systems will be developed and the scope of the terms sensor and computer systems is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for calculating a volume of an individual falling drop by analyzing electromagnetic radiation (EMR) reception, said system comprising:
    an electromagnetic radiation (EMR) source adapted to transmit an EMR in one or more collimated beams to a restricted horizontal planar area, wherein said collimated beams span a width that exceeds a width of a vertical cross section of a center axis of a drop falling along a falling drop path;
    an EMR sensor positioned to capture said EMR, wherein said EMR source and said EMR sensor are positioned on a common vertical axis such that said EMR transmitted by said EMR source towards said drop is reflected by said drop and directed towards said EMR sensor;
    a program store storing code; and
    a processor coupled to the program store and said EMR sensor for executing said stored code, said code comprising:
        code instructions for acquiring a plurality of outputs of said EMR sensor;
        code instructions for calculating a plurality of widths along a vertical axis of said drop, each one of said plurality of widths is calculated according to one of said plurality of outputs;
        code instructions for calculating a volume of said drop by combining said plurality of widths and a velocity of said drop when said drop is falling along said falling path;
        code instructions for detecting, based on said plurality of calculated widths, at least one image of said drop;
        code instructions for comparing said at least one image to a respective image of at least one of a plurality of exemplary drops of different content types of liquid;
        code instructions for identifying, according to said comparison, one of said different content types as a liquid type of content of said drop; and
        code instructions for controlling a flow rate of a liquid delivering device, according to said calculated volume.

2. The system of claim 1, wherein said velocity is calculated by a falling body equation.

3. The system of claim 1, wherein said volume is calculated by a curve fitting function combines volumetric data and respective velocity data of each of a plurality of exemplary drops.

4. The system of claim 1, wherein said liquid delivering device is a feeding device for feeding a patient.

5. The system of claim 1, wherein said drop is one of a plurality of drops analyzed using said system; wherein said code further comprising code instructions for updating a count of said plurality of drops after said drop is detected.

6. The system of claim 1, wherein said EMR source is a light emitting device (LED).

7. The system of claim 1, wherein said code instructions for calculating said plurality of widths additionally comprising instructions for identifying a tail drop falling after said drop by an analysis of said plurality of outputs; further comprising adapting said volume according to a volume estimation of said tail drop.

8. The system of claim 1, wherein said EMR sensor is a high resolution image sensor which captures a plurality of time referenced images of said falling drop, wherein said velocity is calculated according to a location of said drop in two or more said time referenced images.

9. The system of claim 8, wherein said high resolution image sensor is selected from a group consisting of a complementary metal oxide semiconductor (CMOS) module, and a charge couple device (CCD) module.

10. The system of claim 1, wherein said comparing is comparing a time ordered sequence of a plurality of calculated values of widths of said drop to a time ordered sequence of a plurality of values of widths of said plurality of exemplary drops.

11. The system of claim 1, wherein said EMR sensor is a member of a group consisting of an electro optical sensor, a photovoltaic sensor, a photodiode, a photo resister, a photo detector, a photoconductive device, a photo transistor, an optical sensor, a photon sensor, and an infrared radiation sensor.

* * * * *